(12) United States Patent
Amada et al.

(10) Patent No.: US 7,145,589 B2
(45) Date of Patent: Dec. 5, 2006

(54) LIGHT SCANNING APPARATUS HAVING A LIQUID CRYSTAL DEFLECTOR AND IMAGE FORMING APPARATUS USING THE SAME

(75) Inventors: Taku Amada, Kanagawa (JP); Takeshi Ueda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 145 days.

(21) Appl. No.: 10/617,033

(22) Filed: Jul. 11, 2003

(65) Prior Publication Data

US 2004/0057096 A1 Mar. 25, 2004

(30) Foreign Application Priority Data

Jul. 12, 2002 (JP) ............................. 2002-204164
Dec. 27, 2002 (JP) ............................. 2002-379681
Dec. 27, 2002 (JP) ............................. 2002-379958

(51) Int. Cl.
  *B41J 27/00* (2006.01)
(52) U.S. Cl. ....................... 347/241; 347/256
(58) Field of Classification Search ................ 347/232, 347/235–239, 241–244, 253, 255–261, 246–250, 347/134–136; 250/234, 235; 359/641; 349/1–4, 349/74–76
See application file for complete search history.

(56) References Cited

U.S. PATENT DOCUMENTS

| | | | |
|---|---|---|---|
| 5,047,789 A * | 9/1991 | Kanayama et al. | 347/232 |
| 5,053,619 A * | 10/1991 | Arimoto | 250/235 |
| 5,363,128 A * | 11/1994 | Andrews | 347/134 |
| 5,461,412 A * | 10/1995 | Paoli et al. | 347/243 |
| 5,493,326 A * | 2/1996 | Andrews et al. | 347/257 |
| 5,596,430 A * | 1/1997 | Hasegawa et al. | 349/74 |
| 5,606,181 A | 2/1997 | Sakuma et al. | 257/88 |
| 5,680,254 A | 10/1997 | Ueda et al. | 359/652 |
| 5,745,155 A * | 4/1998 | Feinberg | 347/256 |
| 5,753,907 A * | 5/1998 | Nakajima et al. | 250/234 |
| 5,952,649 A | 9/1999 | Amada | 250/234 |
| 6,081,386 A * | 6/2000 | Hayashi et al. | 359/641 |
| 6,400,391 B1 | 6/2002 | Suhara et al. | 347/244 |
| 6,621,512 B1 | 9/2003 | Nakajima et al. | 347/245 |
| 2002/0195552 A1 | 12/2002 | Ueda | 250/234 |
| 2004/0057096 A1 | 3/2004 | Amada et al. | |

FOREIGN PATENT DOCUMENTS

| | | |
|---|---|---|
| JP | 63-240533 | 10/1988 |
| JP | 01114465 A * | 5/1989 |
| JP | 9-189873 | 7/1997 |
| JP | 10-215351 | 8/1998 |

(Continued)

OTHER PUBLICATIONS

U.S. Appl. No. 10/160,153, filed Jun. 4, 2002, Ueda.

(Continued)

*Primary Examiner*—Hai Pham
(74) *Attorney, Agent, or Firm*—Oblon, Spivak, McClelland, Maier & Neustadt, P.C.

(57) ABSTRACT

A light scanning apparatus that scans a scanned face with a light beam includes an adjusting unit that adjusts the position of a light spot of the light beam formed on the scanned face, and a compensating unit that compensates the light intensity of the light beam at the scanned face due to change caused by the adjustment of the position of the light spot. Accordingly, the light scanning apparatus can reduce or eliminate the deviation in exposure between scan lines of the multi-beam scan method and the deviation in exposure between photosensitive bodies of the tandem type image forming apparatus.

20 Claims, 19 Drawing Sheets

FOREIGN PATENT DOCUMENTS

| | | |
|---|---|---|
| JP | 10-239939 | 9/1998 |
| JP | 2000-3110 | 1/2000 |
| JP | 2000-47214 | 2/2000 |
| JP | 2000-227563 | 8/2000 |
| JP | 2002-72606 | 3/2002 |
| JP | 2002-72607 | 3/2002 |

OTHER PUBLICATIONS

U.S. Appl. No. 09/968,546, filed Oct. 2, 2001, Hayashi et al.
U.S. Appl. No. 09/981,869, filed Oct. 19, 2001, Ueda.
U.S. Appl. No. 10/090,824, Mar. 6, 2002, Amada et al.
U.S. Appl. No. 10/143,013, filed May 13, 2002, Suhara et al.
U.S. Appl. No. 10/200,778, filed Jul. 24, 2002, Amada et al.
U.S. Appl. No. 10/617,033, filed Jul. 11, 2003, Amada et al.
U.S. Appl. No. 10/840,369, filed May 7, 2004, Itabashi et al.
U.S. Appl. No. 10/820,733, filed Apr. 9, 2004, Suhara et al.
U.S. Appl. No. 10/735,690, filed Dec. 16, 2003, Suhara.
U.S. Appl. No. 11/032,257, filed Jan. 11, 2005, Amada et al.

* cited by examiner

BEAM DEFLECTING ANGLE
BY LIQUID CRYSTAL (NORMALIZED)

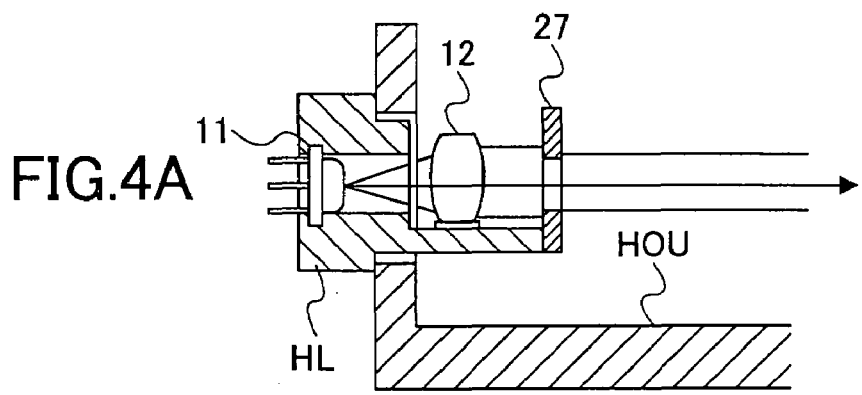
FIG.4A
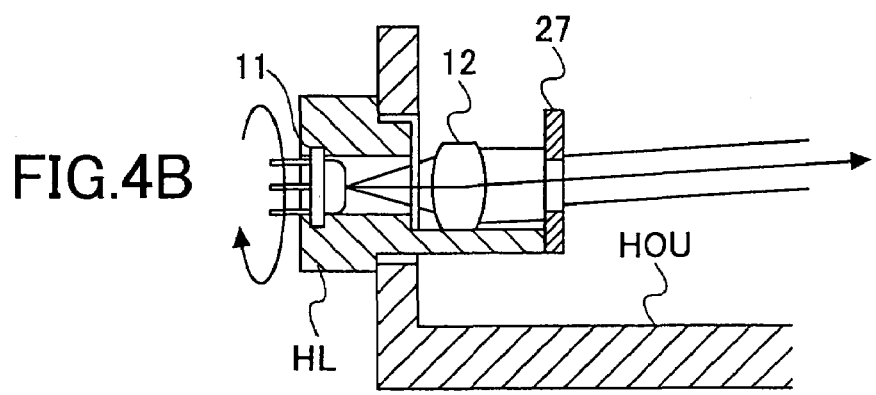
FIG.4B
FIG.5
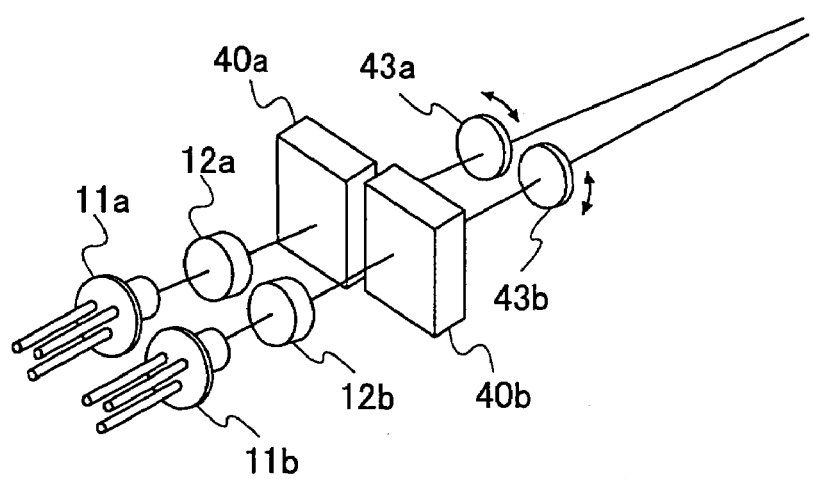

LIGHT SCANNING APPARATUS HAVING A LIQUID CRYSTAL DEFLECTOR AND IMAGE FORMING APPARATUS USING THE SAME

BACKGROUND OF THE INVENTION

1. Field of the Invention

The present invention generally relates to a light scanning apparatus, a light scanning method, and an image forming apparatus.

The present invention relates more particularly to a light scanning apparatus (multi-beam scanning apparatus) that simultaneously scans a face (scanned face) with a plurality of light beams emitted by a light source(s), and to an image forming apparatus such as a laser printer, digital copier, a laser facsimile, and a laser plotter using the light scanning apparatus to write images.

2. Description of the Related Art

Light scanning apparatuses are used for laser printers, digital copiers, facsimile machines, and laser plotters, for example. The light scanning apparatus conventionally uses one light beam (single beam scanning method), but the light scanning apparatus that uses a plurality of light beams to simultaneously scan a single scanned face (multi beam scanning method) is being studied intensively.

Tandem type image forming apparatuses with a plurality of photosensitive media that can form color images are also being studied as well as image forming apparatuses with a single photosensitive medium. The tandem type image forming apparatus is provided with a plurality of drum-shaped or belt-shaped photoconductive photosensitive bodies along the path of a medium to which toner images are transferred. The toner images formed on the plurality of photosensitive bodies are transferred to the common medium (recording sheet) and synthesized into color images. The tandem type image forming apparatuses of the multi-beam scanning method are being studied too.

A scan line is the trace of the light spot scanning the scanned face. The ideal scan line is a line straight in the main scan directions, but the actual scan line is curved and/or tilts even if the light scanning apparatus is precisely assembled. Since the tilted scan line can be regarded as an aspect of the curved scan line, the curved scan line includes the tilt scan line in the following description.

In the case that a monochrome image is formed with the single beam scan method, even if the scan line is slightly curved, the curvature causes few problems since the slight curvature is not visible.

In the case that a scanned face is scanned with the multi-beam scan method, if all the scan lines curve in the same manner, the curvature causes few problems.

However, if the distances between a plurality of scan lines (scan line pitch) differ, the curvature does matter. If the scan line pitch within an image varies in the sub scan directions, the image is distorted or the density of the image is not uniform. The distortion of the image and the non-uniformity of the image density degrade the quality of the image substantially.

If the curvature of the scan lines is not uniform in a color image formed by a tandem type image forming apparatus, the curvature results in an unevenness in color, density, and hue.

In the case of the multi-beam scanning method, the scan pitch changes over time however precisely the light scanning apparatus is initially adjusted. In the case of the tandem type image forming apparatus, the change over time in the curvature of the scan lines is inevitable even if the curvature is equalized at the initial stage.

Especially, if a resin lens is provided in the light path from the light source to the scanned face, the resin lens may deform due to changes in temperature and/or humidity. Accordingly, the scan line pitch in a photosensitive body may change, and the curvature of the scan lines of different photosensitive bodies may differ.

The scan line pitch and the scan line curvature can be compensated by adjusting the light spot position on the scanned face in the sub-scan directions. There are various methods to adjust the light spot position.

Japanese Patent Laid-open Application No. 9-189873 discloses an invention in which the scan line pitch of the multi-beam scanning method is adjusted at high precision by reflecting light beams emitted by light sources with a galvanic mirror on the light path to a light deflecting unit and adjusting the angle of the galvanic mirror to move the light spot position on the scanned face in the sub-scan directions.

The above invention also proposes to compensate the scan line curvature and the scan line pitch by adjusting the light spot position in the sub-scan directions on the scanned face with a liquid crystal element.

The above methods effectively adjust the scan line pitch and compensate the scan line curvature, but inherit a side effect in that the adjustment of the light spot position also changes the light intensity of the light spot.

In the case of the invention described in Japanese Patent Laid-open Application No. 9-189873, if an aperture for shaping the light beam is provided between the galvanic mirror and the scanned face, the light beam adjusted in the sub-scan directions by the galvanic mirror may be partially blocked by the aperture, and consequently, the light intensity of the light spot may be reduced.

In the case that the liquid crystal element is used, a change in deflecting angle causes a change in the transmissivity of the liquid crystal element, and results in a change in the light intensity of the light spot.

In the case of the multi-beam scanning method, for example, if the light intensity of the light spots varies between the scan lines, especially the quality of half-tone images often degrades substantially. In the case of forming color images of the tandem type, if the exposure of the photosensitive bodies differs from one body to another due to the inequality of the light intensity of the light spots, the hue of the color images changes, and accordingly, the color reproducibility is degraded.

One of the methods to increase the writing speed at which the light scanning apparatus forms images is to increase the rotative speed of a polygon mirror that is a deflecting unit. This method has a limit in applicability due to the durability, noise, and vibration of a motor that rotates the polygon mirror and the limit in the modulation speed of the laser. To solve the above problems, a proposal is made for a light scanning apparatus that writes a plurality of lines simultaneously using a plurality of light beams (see Japanese Patent Laid-open Applications No. 2000-227563, 10-215351, and 9-189873, for example).

A multi-beam semiconductor laser is, for example, a semiconductor laser array in a package that emits a plurality of light beams. Such a multi-beam semiconductor laser can be used as a light source unit of the light scanning apparatus (multi-beam scanning apparatus). In the case of the semiconductor laser array, however, it is difficult to increase the number of channels due to the limitations of fabrication processes, to remove thermal and electrical crosstalk, and to shorten the wavelength of the light beam. The cost of the semiconductor laser array is still high.

On the other hand, single beam semiconductor lasers are used for general purposes in various industrial fields since short wavelength types are readily available and production cost thereof is low. Many proposals have been made for multi-beam scanning apparatuses that use the single beam semiconductor lasers or the above multi-beam semiconductor lasers as the light source and generate a plurality of light beams using a beam generating unit.

In the case that a plurality of light beams are generated using the beam generating unit, compared with the case in which the semiconductor laser array is used as the light source unit, the beam spot arrangement (scan line pitch) on the scanned face often changes due to environmental and timewise (elapsed time) change.

Accordingly, a method of compensating the beam spot arrangement on the scanned face by providing an electrically driven liquid crystal element in a light source unit or just after the light source unit, and deflecting the light beam in response to the electrical signal by a micro angle (from several minutes to several tens of minutes) is proposed (see Japanese Patent Laid-open Applications No. 2000-3110 and 2000-47214).

A description is made of the liquid crystal below.

The liquid crystal element used as the light path deflecting element includes a nematic liquid crystal layer of homogenous molecular arrangement sandwiched by two glass substrates. Inside of the glass substrates are formed transparent electrodes made of metal oxide. Generally, a uniform electrode is formed over the entire surface of a glass substrate (bottom face, for example) to form an electrical ground plane, and a patterned electrode that provides electric field distribution to the liquid crystal layer is formed on the other glass substrate (top face, for example). When an alternating voltage (rectangular pulses of several kilo Hertz, for example) is applied to the liquid crystal layer, nematic liquid crystal molecules having birefringence (a difference in refractive index along the long axis and the short axis of the molecules) are tilted along the electric field. The liquid crystal layer is equivalent to a medium having a locally different refractive index distribution in response to the electric field distribution for a single color light having a linear polarization parallel to the liquid crystal molecule (the direction of the long axis). Accordingly, the light transmitting threeough the liquid crystal layer is spatially modulated in its wave surface or phase depending on the in-plane distribution of the applied voltage.

The electro-optic property of the liquid crystal element depends on the elasticity and the dielectric anisotropy of the liquid crystal used and the initial orientation angle of liquid crystal molecules without the application of voltage. The electro-optic property of a liquid crystal element with a small initial orientation angle (5 degrees or less) exhibits a steep rise (threshold) in a low voltage region. As the voltage increases, the electro-optic property becomes linear, then converges into a constant. The electro-optic property of a liquid crystal element with a large initial orientation angle has no threshold. The curve in the low voltage region can be approximated with a second order polynomial.

A proposal is made on the pattern of electrodes in which many long and narrow stripe-shaped electrodes are provided and a predetermined voltage is applied to each electrode. This structure is characterized in realizing a high speed response, a high spatial resolution, and degrees of freedom in the wave surface modulation (any complex wave surface modulation as well as the functions of beam deflection and lenses).

In the case that the light path deflecting element is constructed by the liquid crystal element, the linear region of the electro-optical property of liquid crystal and ladder shaped electrodes are used. The stripe-shaped long and narrow transparent electrodes of the current exposure technique having width and pitch depending on the resolution (about 1 µm) are formed in the beam exposing region. Both ends of the stripe-shaped electrodes are connected to gradient potential electrodes expanding horizontally on the outside. The electrodes are structured in such a manner that a plurality of ladder-type electrodes are arranged. The number (width) of bound long and narrow electrodes is determined by the maximum beam deflecting angle required in the region.

In the case that two different voltages selected from the linear region of the electro-optical property are applied to respective ends of the gradient potential electrode spreading in the crosswise directions, a blaze type phase profile is obtained and becomes equivalent to a micro prism array. The deflecting of the light beam perpendicularly incident on the liquid crystal layer is possible by controlling the applied voltage, and consequently the blaze angle.

In the case that the liquid crystal element is used as a light path deflecting element, as described above, it is necessary to provide an electric field distribution to the liquid crystal layer and to form a linear refractive index distribution (refractive index gradient). On the other hand, in the case that a large beam deflecting angle (maximum deflecting angle) is desired, the thickness of the liquid crystal layer needs to be increased. There is no spherical spacer material to be distributed in the liquid crystal layer for general use. The thickness of the liquid crystal layer for liquid crystal monitors is usually 5 µm. In the case that a liquid crystal layer with thickness of more than 10 µm, for example, needs to be secured, one needs to use low-grade spacer material with high diameter deviation. As a result, it is difficult to keep uniform thickness of the liquid crystal layer, and to sustain the linearity of the refractive index distribution of the liquid crystal layer, for example.

A tandem type full-color image forming apparatus is provided with four photosensitive body drums corresponding to cyan (C), magenta (M), yellow (Y), and black (K) disposed along the transportation surface of a intermediate transfer belt. A light scanning apparatus correspondingly provided for each photosensitive body drum scans the photosensitive body drum. An electrostatic latent image is formed on the surface of each photosensitive body drum, and is made visible with a toner of corresponding color. The toner images are sequentially transferred to a sheet of paper carried by the intermediate transferring belt, and a multi-color image is formed.

The scanning unit of the above light scanning apparatus is usually a polygon mirror rotated by a motor at a predetermined rotative speed. The light scanning apparatus includes a line cycle signal generating unit. The line cycle signal generating unit detects the laser beam from the scanning unit at a predetermined position, and generates a line sync signal. The laser beam is modulated by the image signal in synchronization with this line sync signal, and the image is written line by line. An intermediate transfer reference signal generating unit detects a mark on the intermediate transfer body at a predetermined position, and generates an intermediate transfer reference signal. An image forming operation of each color to form a toner image of the color on the photosensitive body drum is executed in synchronization with the intermediate transfer reference signal.

In such a color image forming apparatus, since the intermediate transfer reference signal and the line sync signal are not in synchronization, the phases of the intermediate transfer reference signal and the line sync signal greatly deviate as the number of the laser beams increases. Since the starting positions at which the images are written in the sub-scan directions deviate, the position of the toner image of each color deviates from the others, which results in the degrading of the multi-color images.

To solve this problem, a proposal is made on a color image forming apparatus characterized by a compensating unit that adjusts the starting position at which the image of each color is formed in the sub-scan directions and compensates for the color image deviation by switching the laser beams that first write the images on the photosensitive body drum depending on the phase relationship of the intermediate transfer reference signal and the line sync signal (see Japanese Patent Laid-open Application No. 10-239939).

However, the order in which the laser beams start writing changes randomly depending on the phase difference between the mark signal and the sync detection signal attached to the intermediate transfer belt. Accordingly, even in the case that the difference between the power of the plurality of laser beams is very small, the light energy exposing the photosensitive body drum of each color varies, even though the image of the color is the same. Accordingly, the color of the image becomes unbalanced (see Japanese Patent Laid-open Applications No. 2002-72606 and No. 2002-72607). According to an experiment, the color variation caused by a power deviation of 2% is already visible. The color variation is especially apparent in the case of reproducing grey color.

On the other hand, the image forming speed of such a color image forming apparatus needs to be improved. It is necessary to increase the rotative speed of the polygon mirror that is a scanning unit of the light scanning apparatus and/or to increase the frequency of the image signal in order to satisfy the need. However, if the rotative speed of the scanning unit and the frequency of the image signal are increased, the durability, noise, and vibration of the motor driving the polygon mirror and the modulation speed of the semiconductor laser cause problems. Accordingly, a multi-beam scanning apparatus is proposed that simultaneously scans a plurality of light beams and writes a plurality of lines.

The multi-beam semiconductor laser such as the semiconductor laser array that has a plurality of radiation points (radiation channels) in a package can be used for the multi-beam light source apparatus that emits a plurality of laser beams. However, it is difficult to increase the number of channels due to the restrictions of fabrication processes, to remove thermal and electrical crosstalk between channels, and to fabricate the semiconductor laser array that emits light beams of short wave length. Multi-beam semiconductor lasers having such desired features are expensive.

Light source apparatuses and multi-beam scanning apparatuses that are provided with single-beam semiconductor lasers as the light sources and generate a plurality of laser beams using a beam generating unit are also usable. The plurality of laser beams generated by the beam generating unit are often affected by environmental and changes over time. The arrangement of beam spots on the scanned face (beam pitch) consequently changes. To solve this problem, a method is proposed in which an electrically driven liquid crystal element is provided to compensate the beam pitch.

However, the liquid crystal element to adjust the light beam positions of the plurality of light beams on the scanned face causes deviation in intensity of the plurality of light beams. This deviation may result in the degrading in quality of images formed by the color image forming apparatus.

SUMMARY OF THE INVENTION

Accordingly, it is a general object of the present invention to provide a novel and useful light scanning apparatus and image forming apparatus with which at least one of the above problems is solved.

More particularly, it is an object of the present invention to effectively compensate the light intensity deviation of the light spot accompanying the compensation of the scan line pitch and the scan line curvature including tilt.

Another object of the present invention is to provide a multi-beam scanning apparatus that can adjust the light beam position on the scanned face without affecting various optical properties thereof and an image forming apparatus using the same.

Yet another object of the present invention is to provide a light scanning apparatus that can reduce the deviation in intensity of the plurality of light beams on the scanned face, and an image forming apparatus using the same.

To solve at least one of the above problems, a light scanning apparatus that scans a scanned face with a light beam, includes: an adjusting unit that adjusts a position of a light spot of said light beam formed on a scanned face; and a compensating unit that compensates a light intensity of said light beam at said scanned face caused by the adjustment of said position of said light spot.

The adjusting unit adjusts the position of the light spot on the scanned face, and the compensating unit compensates the change in intensity of the light spot caused by the adjustment of the light spot position by the adjusting unit.

The light scanning apparatus may be further characterized in that said light scanning apparatus scans said scanned face with a plurality of (N) light beams emitted by "N" light sources; said adjusting unit further comprises at least "N-1" deflecting units located between said light source and a scanning unit, each of the deflecting units deflects corresponding one of the plurality of light beams in sub-scan directions and adjusts scan line pitch.

In this case, assuming that each light source is a semiconductor laser emitting a light beam, the scanned face is simultaneously scanned with N light spots and N scan lines are formed. There are "N-1" distances between scan lines to be adjusted. All distances between scan lines can be adjusted by deflecting "N-1" light beams in the sub-scan directions using a light beam as a reference.

Each of the above "N" light sources is not necessarily a light source that radiates a single light beam, and may be a semiconductor laser array with arrayed "n" semiconductor laser radiation sources. In this case, the scanned face is scanned with "N*n" scan lines simultaneously. Regarding "n" scan lines formed by the "n" light beams radiated by each semiconductor laser array as a group, the scan line pitches of the "N" groups may need to be adjusted. In this case, the "n" light beams are deflected by the group by "N-1" deflecting units.

Of course, if "N", instead of "N-1", deflecting units are used, all "N" scan lines can be displaced in the sub-scan directions. In the case that each photosensitive body is scanned with multi-beam method in a tandem type image forming apparatus, the positions of the toner images transferred from each photosensitive bodies can be adjusted more precisely.

The deflecting units may be liquid crystal deflecting elements.

Said deflecting unit may further include a semiconductor laser and a coupling lens combined by a holder rotatable around an axis parallel to an optical axis of said coupling lens, radiation source of said semiconductor laser being eccentric to said optical axis.

Said deflecting unit may further include an aperture combined by said holder that shapes said light beam, said aperture being concentric to a light path of said light beam emitted by said semiconductor laser and passing through the center of said coupling lens.

Said adjusting unit may further include an liquid crystal deflecting element array having a plurality of liquid crystal deflecting elements arrayed in main-scan directions, each of which deflects said light beam in sub-scan directions, said liquid crystal deflecting element array provided between said scanning unit and said scanned face.

The liquid crystal deflecting element array can compensate the curvature of the scan line (including tilt). The liquid crystal deflecting element array functions as an adjusting unit that adjusts a light spot position, and effectively adjusts the curvature of the scan line on each photosensitive body of a tandem type image forming apparatus that scans each photosensitive body with a single beam method.

Assuming there are "m" photosensitive bodies, the number of required liquid crystal deflecting element array is "m−1" or "m". In the case that using a scan line as a reference, the curvatures of the other scan lines are to be adjusted to the reference, only "m−1" liquid crystal deflecting element array suffice.

As described above, when the light spot is adjusted by the adjusting unit, the light intensity of the adjusted light spot changes, and the light intensity of the light spots loses uniformity. The compensating unit compensates this non-uniformity.

In general, in the case that the light spot position is adjusted by the adjusting unit, it is possible to determine how much the light intensity of the light spot changes as the light spot position is adjusted in advance theoretically or by experiments. The compensating unit can compensate the light intensity based on this theoretical or experimental knowledge. However, the actual change in the light intensity may depend on the deviation of components and assembly, and degrading over time of the precision of assembly.

The light scanning apparatus may further include a detecting unit that detects intensity of said light beam, and said detecting unit may further detect synchronization of light scanning.

Said compensating unit can control radiation intensity of said light source.

The light scanning apparatus may further include an aperture provided between said light source and said scanning unit, that shapes said light beam; wherein said compensating unit displaces said aperture.

The light scanning apparatus is further characterized in that said compensating unit controls a transmissivity adjusting unit provided between said light source and said scanning unit. The compensating unit may be used alone or combined together.

The light scanning apparatus may further include a resin lens provided in the optical path from said light source to said scanned face. Since the optical properties of the resin lens depends on temperature and humidity, the position of light spot may change and increase the curvature of the scan line. The resin lens, however, is useful in forming a lens of complex shape inexpensively.

As described above, the light scanning apparatus can adjust the position of the beam spot with the adjusting unit, and the above problems of resin lenses can be solved.

An image forming apparatus is characterized of: a photosensitive medium; and a light scanning apparatus that scans said photosensitive medium with a light beam; wherein said light scanning further includes: an adjusting unit that adjusts a position of a light spot of said light beam formed on said photosensitive medium; and a compensating unit that compensates the light intensity change of said light beam at said photosensitive medium caused by the adjustment of said position of said light spot.

In the image forming apparatus said photosensitive medium may be a photoconductive photosensitive body; and an electrostatic latent image formed by the light scanning may be made visible by being converted into a toner image. In this case, said light scanning apparatus scans said photoconductive photosensitive body with a plurality of (N) light beams emitted by "N" light sources; and said adjusting unit further comprises at least "N-1" deflecting units located between said light source and a scanning unit, each of the deflecting units deflects a corresponding one of the plurality of light beams in sub-scan directions and adjusts scan line pitch.

Of course, the image forming apparatus may include a liquid crystal deflecting element array between the scanning unit and the scanned face as the adjusting unit or a part of the adjusting unit. In this case, it is desired to provide the detecting unit that detects the light intensity of the light beam.

The detecting unit can have a function to provide the synchronization of the light scanning as well. The compensating unit has a function to adjust the radiation intensity of the light source, a function to displace the aperture for shaping the light beam, and a function to adjust the transmissivity being provided between the light source and the scanning unit. The compensating unit may have two or more of the above functions simultaneously. Needless to say, a resin lens may be provided in the light path from the light source to the scanned face.

The image forming apparatus, may be characterized in that said image forming apparatus is a tandem type in which one or more photosensitive bodies that are drum-shaped or belt-shaped are provided along a path of a toner image medium, and a toner image formed on each photosensitive body is transferred to said toner image medium generating a composite color image.

In this case, three or four photosensitive bodies may be provided corresponding to magenta, cyan, yellow, and black, or instead of the above colors, red, green, and blue toners may be used.

The toner image transferring medium is an intermediate transferring medium such as an intermediate transferring belt or a recording sheet. The recording sheet is a transferring paper or overhead projector (OHP) sheet, for example.

As described above, the light scanning apparatus adjusts the position of the light spot on the scanned face and compensates the change in the light intensity of the light spot caused by the adjustment of the light spot position. Accordingly, the light scanning apparatus can reduce or eliminate the deviation in exposure between scan lines of the multi-beam scan method and the deviation in exposure between photosensitive bodies of the tandem type image forming apparatus.

A light scanning apparatus that scans a scanned face with a plurality of (N) light beams, is characterized by a plurality of adjusting units, each of which adjusts a position of a scan line formed by a corresponding one of the plurality of light beams; wherein at least one of the plurality of adjusting units is a liquid crystal element driven by an electric signal.

The invention is characterized, in the light scanning apparatus, by a memory unit that stores said electric signal driving said liquid crystal element.

The invention is characterized in that, in the light scanning apparatus, said liquid crystal element initially adjusts said position of scan line in compliance with said electrical signal stored in said memory unit.

The invention is characterized in that, in the light scanning apparatus, said liquid crystal element adjusts the position of a light beam of which change is caused by an external disturbance.

The invention is characterized in that, in the light scanning apparatus, said liquid crystal element is able to deflect said light beam by a micro angle.

The invention is characterized in that, in the light scanning apparatus, at least "N-1" of the plurality of adjusting units are liquid crystal elements.

The invention is characterized in that, in the light scanning apparatus, a maximum deflecting angle of each liquid crystal element is +/−4.0 (minute) or less.

The invention is characterized in that, the light scanning apparatus, the plurality of adjusting units are liquid crystal elements of which maximum deflecting angle is +/−2.0 (minute).

An image forming apparatus is characterized by: a plurality of scanned faces; and a light scanning apparatus that scans the plurality of scanned face with a plurality of (N) light beams and forms electrostatic latent images on the plurality of scanned faces; wherein said light scanning apparatus further comprises a plurality of adjusting units, each of which adjusts the position of a scan line formed by a corresponding one of the plurality of light beams; and at least one of the plurality of adjusting units is a liquid crystal element driven by an electric signal.

The invention is characterized in that, in the image forming apparatus, said liquid crystal element can change pixel density in sub-scan directions.

A light scanning apparatus is characterized by a liquid crystal element that deflects a light beam from a light source to adjust the position of a light spot formed by said light beam on a scanned face; wherein the ratio of a change in transmissivity (%) of said liquid crystal element caused by the deflection to a deflecting angle (minute) is equal to or smaller than 2.0 (%/minute).

The invention is characterized in that, in the light scanning apparatus, said ratio is equal to or smaller than 2.0 (%/minute) in 10 or more ranges of said deflecting angle, said ranges appearing cyclically.

The invention is further characterized by, in the light scanning apparatus, including a detecting unit that detects intensity of said light beam on said scanned face.

The invention is further characterized, in the light scanning apparatus, by a compensating unit that compensates intensity of said light beam on said scanned face.

An image forming apparatus is characterized by: a scanned face; and a light scanning apparatus that scans said scanned face with a light beam and forms a electrostatic latent image on said scanned face; wherein said light scanning apparatus further comprises a liquid crystal element that deflects said light beam from a light source to adjust the position of a light spot formed by said light beam on said scanned face; and the ratio of a change in transmissivity (%) of said liquid crystal element caused by the deflection to a deflecting angle (minute) is equal to or smaller than 2.0 (%/minute).

Other objects, features, and advantages of the present invention will become more apparent from the following detailed description when read in conjunction with the accompanying drawing.

BRIEF DESCRIPTION OF THE DRAWINGS

FIGS. 4A and 4B are schematic diagrams for explaining an embodiment according to claim 8;

FIG. 5 is a schematic diagram for explaining an embodiment according to claim 14;

DETAILED DESCRIPTION OF THE PREFERRED EMBODIMENTS

Preferred embodiments of the present invention will be described by reference to the drawings.

Figure 1A:
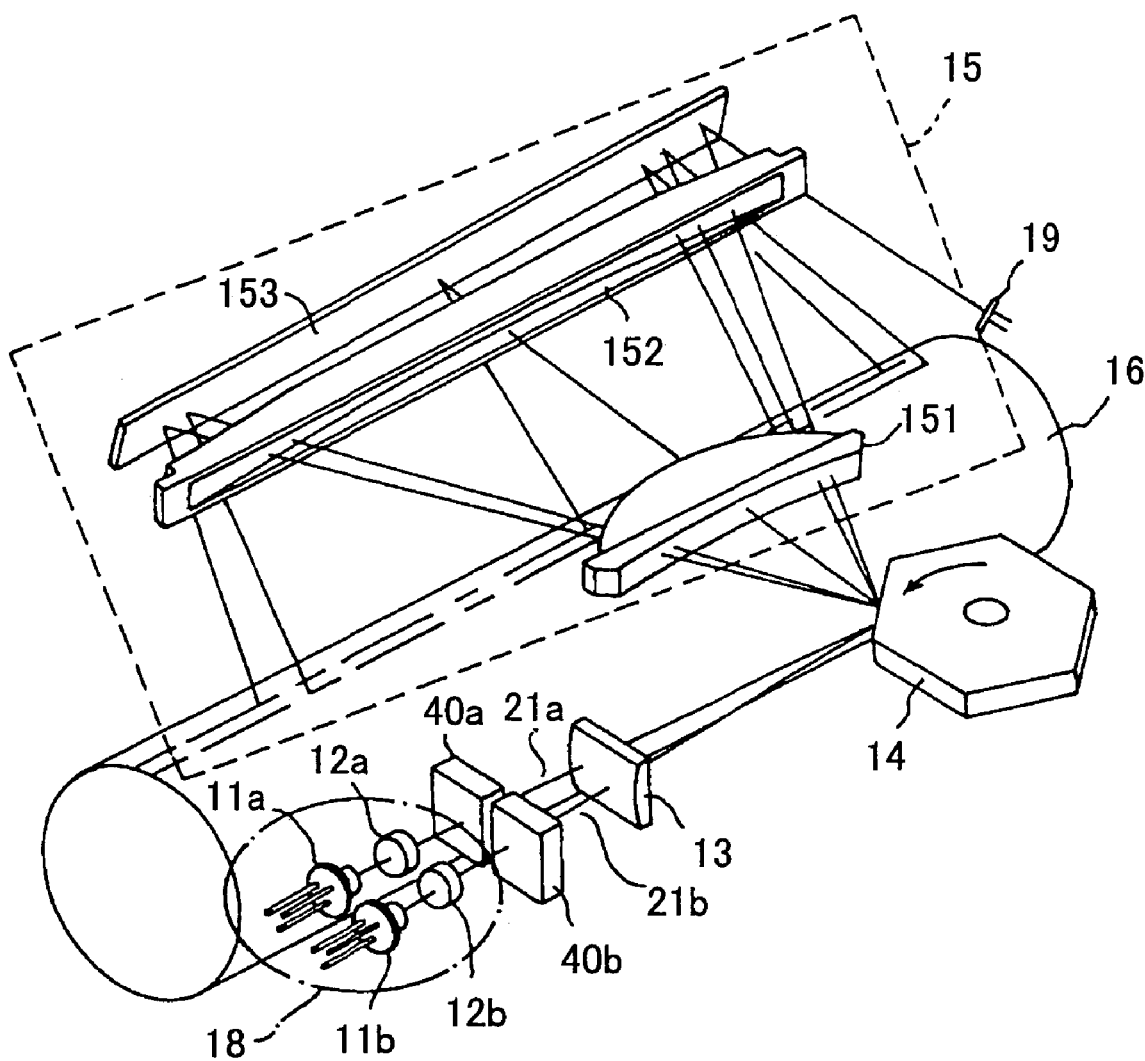
FIGS. 1A–1C are schematic diagrams showing a light scanning apparatus according to an embodiment of the present invention.

FIG. 1A is a schematic diagram showing a multi-beam light scanning apparatus according to an embodiment of the present invention.

Semiconductor laser diodes 11a and 11b are provided as light sources, and each of them emits a diverging light beam. The light beams are transformed into parallel beams by coupling lenses 12a and 12b so that they fit the remaining optical system in this case. In another case, the light beams may be transformed into weakly diverging beams or weakly converging beams.

The light beams transformed by the coupling lenses 12a and 12b go through beam deflecting units 40a and 40b, respectively. The light beams are converged in the sub-scan directions by a cylindrical lens 13, and form long linear images in the main-scan directions on the deflecting reflective face of a polygon mirror 14. The linear image formed by one light beam is separated from the other by a predetermined small distance.

As the polygon mirror 14 rotates at a constant rotative speed, the light beams are deflected at a constant rotative speed, and pass through lenses 151 and 152. The light beams are reflected by a reflective mirror 153, and form two light spots separated from each other by a predetermined distance in the sub-scan directions on the photosensitive face of a drum-shaped photoconductive photosensitive body 16. The light beams scan the photosensitive body 16 on the two scan lines simultaneously.

The lenses 151 and 152 form an "fθ lens". The fθ lens corresponds to a "scan image forming optical system", and the lenses 151 and 152 correspond to "resin lenses".

The deflected light beams, before scanning the photosensitive body 16, reach a light sensor 19 provided outside the recording region. The light sensor 19 outputs a signal for synchronization. That is, the light sensor 19 corresponds to "synchronization detecting unit of scan".

The light sensor 19 corresponds to "light intensity detecting unit" that detects the light intensity of each light beam. That is, the light scanning apparatus is provided with the light intensity detecting unit 19 for detecting the light beam intensity. This light intensity detecting unit also corresponds to the synchronization detecting unit of scan.

The light sensor 19 also corresponds to the scan line pitch detecting unit.

Figure 1B:
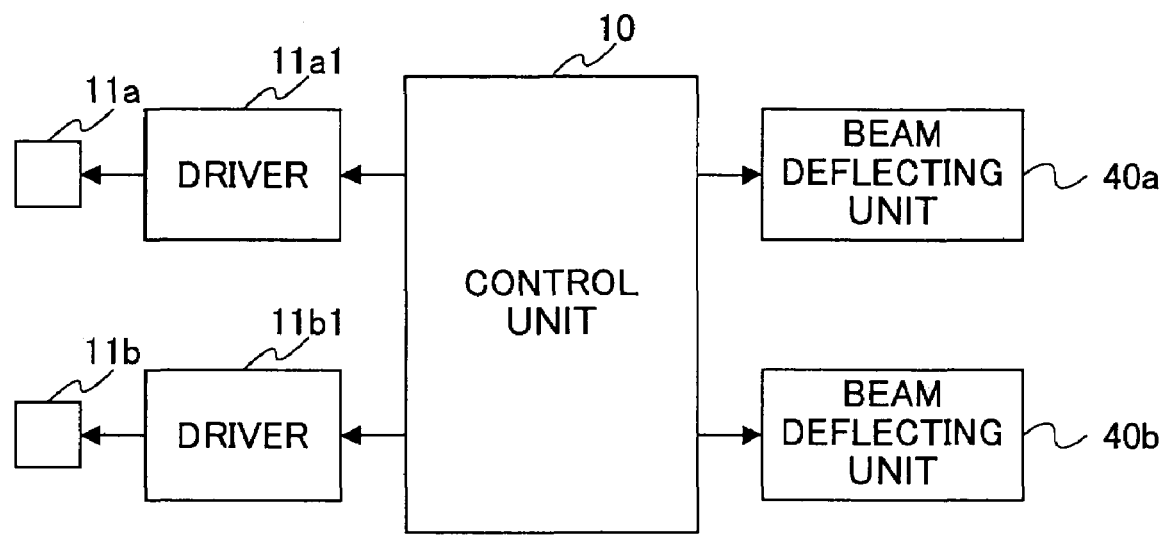
Figure 1C:
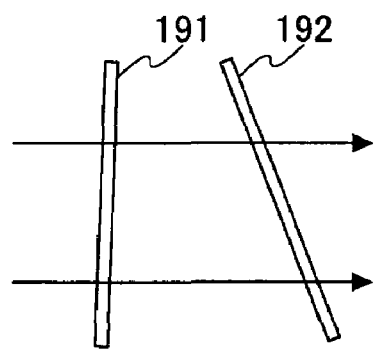

As shown in FIG. 1C, the sensor unit of the light sensor 19 has two PIN photo diodes 191 and 192 of which light reception faces are linear-shaped long in one direction. The light reception face of the PIN photo diode 191 is parallel to the sub-scan directions, and the light reception face of the PIN photo diode 192 is tilted to the sub-scan directions. The output of the PIN photo diode 191 is used for synchronization and light intensity detection.

The scan line pitch can be adjusted by making each semiconductor laser emit the light beam separately to detect the difference in time of the output of the PIN photo diodes 191 and 192. Since the distance between the PIN photo diodes 191 and 192 linearly changes in the sub-scan directions, the position in the sub-scan directions at which the light beam crosses the light sensor 19 can be obtained based on the time difference.

For example, "t1" and "t1'" indicate theoretical time and actual (measured) time, respectively, required for the light beam emitted by the semiconductor laser 11a to cross the PIN photo diodes 191 and 192 of the light sensor 19. Likewise, "t2" and "t2'" indicate theoretical time and actual (measured) time, respectively, required for the light beam emitted by the semiconductor laser 11b to cross the PIN photo diodes 191 and 192 of the light sensor 19. Time t1'−t1 and t2'−t2 are displacements of the scan line of each light beam in the sub-scan directions.

Information of the displacement of the scan line is obtained by a control unit 10 shown in FIG. 1B. The control unit 10 is configured by a CPU or a microcomputer, for example. The control unit 10 may be a part of a control unit that controls the entire light scanning apparatus or the entire image forming apparatus using the light scanning apparatus.

The control unit 10 calculates the time $\Delta t1 = t1' - t1$ and $\Delta t2 = t2' - t2$. A compensative amount of the scan line position of the light beam emitted by the semiconductor laser 11a based on the calculation of $\Delta t1$ is calculated, and a compensative amount of the scan line position of the light beam emitted by the semiconductor laser 11b based on the calculation of $\Delta t2$ is calculated.

The control unit 10 controls beam deflecting units 40a and 40b based on the (respective) compensative amounts to bend each light beam in the sub-scan directions so as to obtain an appropriate scan line pitch on the scanned face. In an embodiment shown in FIG. 1A, the beam deflecting unit 40a and 40b are liquid crystal deflecting elements, for example. The liquid crystal deflecting element is described in detail below.

A deflected angle $\phi_z$ of the light beam in the sub-scan directions and a displacement amount $\Delta Z$ of the light spot in the sub-scan directions (in this case, a displacement amount of the scan line itself in the sub-scan directions) satisfies the following relation:

$$\Delta Z = f_{cp} * m_z * \tan \phi_z, \text{ or}$$

$$\phi_z = \tan^{-1}[\Delta Z/(f_{cp} * m_z)],$$

where $m_z$ is widthwize magnification in the sub-scan directions of the entire optical system between the light source and the scanned face, and $f_{cp}$ is the focal distance of the coupling lenses 12a and 12b.

In the case that the light intensity of the light beam changes as it is deflected by the beam deflecting unit in the sub-scan directions, the control unit 10 controls driver circuits 11a1 and 11b1 driving the semiconductor lasers 11a and 11b so that the light intensities of the light spots are substantially equal on the scanned face.

In the light scanning apparatus shown in FIG. 1A, the light beams emitted by the light sources 11a and 11b are deflected by the light deflecting unit 14, and the deflected light beams are converged on the scanned face 16 by the scan convergence optical system 151, 152, and 153. The light scanning apparatus is further provided with light spot position adjusting units 40a and 40b that adjust the light spot position on the scanned face, and light intensity compensation units 11a1 and 11b1 that compensate change in the light intensity of the light spots accompanying the adjustment of the light spot position by the light spot position adjusting unit.

The light scan uses multiple light beams emitted by "N" (=2) light sources 11a and 11b (multi-beam scan method). The light spot position adjusting unit has "N" (=2) beam deflecting units 40a and 40b that bend light beams from "N" (=2) light sources to the light deflecting unit in the sub-scan directions, the beam deflecting units 40a and 40b being provided between the light sources 11a, 11b and the light deflecting unit 14. The beam deflecting units 40a and 40b adjust the scan line pitch of the multi-beam scan method. The beam deflecting units 40a and 40b are "liquid crystal deflecting elements".

The light scanning apparatus is further provided with the light intensity detecting unit 19 that detects intensity of the light beam. The light intensity detecting unit 19 concurrently functions as a synchronization detecting unit of the light scan. The light intensity compensating units 11a1 and 11b1 are the units for adjusting emission intensity of the light sources 11a and 11b, respectively. Resin lenses 151 and 152 are provided in the light path from the light source to the scanned face.

A "liquid crystal deflecting element" is briefly described that is the beam deflecting units 40a and 40b constructing the light spot position adjusting unit shown in FIG. 1A. The liquid crystal deflecting element is an optical element that bends the direction of light beam using the function of liquid crystal. Various types of liquid crystal deflecting elements are known.

Liquid crystal deflecting elements can be driven by an electronic signal or a magnetic signal. The liquid crystal deflecting element to be used as the beam deflecting unit may be driven either electrically or magnetically. In the following description, the beam deflecting unit of FIG. 1 is assumed to be an electrically driven liquid crystal deflecting element.

The electrically driven liquid crystal deflecting elements are roughly divided into the liquid crystal deflecting elements of which refractive index is changed and the liquid crystal deflecting elements that induce diffraction. The liquid crystal deflecting elements of which refractive index is changed are described below.

Such a liquid crystal deflecting element is described in Japanese Patent Laid-open Application No. 63-240533. FIG. 2 shows such an example.

Figure 2A:
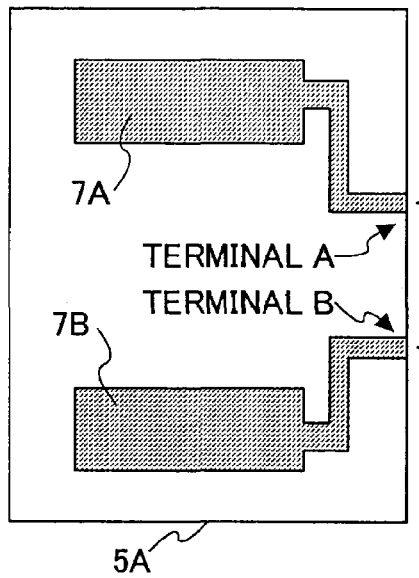
FIGS. 2A–2D are schematic diagrams for explaining a liquid crystal deflecting element used as a beam deflecting unit.
Figures 2B, 2C:
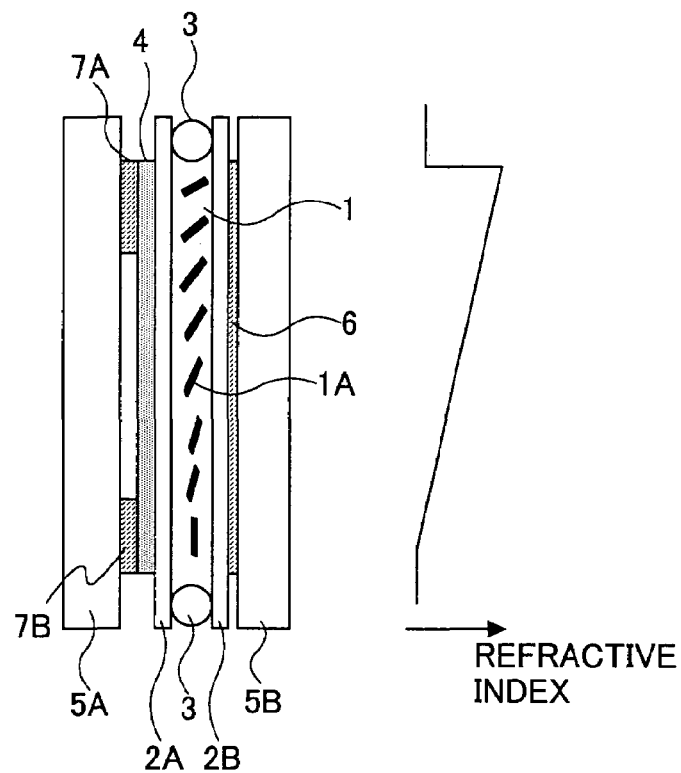

In FIG. 2B, liquid crystal 1 is nematic liquid crystal with positive dielectric anisotropy that is hermetically sealed in a thin layer between a pair of transparent orientation films 2A and 2B between which a gap is maintained at a predetermined width by spacers 3. The liquid crystal molecule designated by a numeral 1A is long in the direction of molecular axis. The orientation film 2A is orientation processed so that the molecular axis of the liquid crystal molecule 1A becomes perpendicular to the face of the orientation film. The orientation film 2B is orientation processed so that the molecular axis of the liquid crystal molecule 1A becomes parallel to the face of the orientation film.

A transparent electric resistance film 4 made of ZnO, for example, is formed on the opposite side of the orientation film 2A, which side is not in contact with spacers 3.

The transparent electric resistance film 4, the orientation films 2A, 2B, and the liquid crystal 1 are sandwiched by a pair of transparent glass substrates 5A and 5B. A transparent electrode film 6 made of ITO, for example, is formed over the entire face of the glass substrate 5B at the orientation film 2B side.

On the other hand, electrodes 7A and 7B of which patterns are shown in FIG. 2A are formed on the face of the glass substrate 5A at the orientation film 2A side. These electrodes 7A and 7B touch the electric resistance film 4 as shown in FIG. 2B.

The electrodes 7A and 7B need to be formed by ITO, for example, if the electrodes overlap a region through which the light beam transmits. The electrodes 7A and 7B, however, may be formed by nontransparent metal film, for example, if the electrodes do not overlap the region through which the light beam transmits (if the electrodes 7A and 7B do not block the light beam). The electrodes 7A and 7B shown in FIG. 2 are transparent electrodes.

If the electrode film 6 and the electrode 7B are grounded, and a voltage V is applied between the terminals A and B of the electrodes 7A and 7B as shown in FIG. 2A, the potential of the electric resistance film 4 linearly decreases from the electrode 7A to the electrode 7B. Accordingly, there exists an electric field (that is directed in the horizontal directions) between the electric resistance film 4 and the transparent electrode film 6 linearly decreasing from the upper side to the lower side of FIG. 2B.

This electric field affects the liquid crystal 1 and causes the liquid crystal molecule 1A to turn so that the molecular axis of the liquid crystal molecule 1A becomes parallel to the electric field. The rotative angle of the liquid crystal molecule 1A is linearly proportional to the strength of the electric field. The molecular axis of the liquid crystal molecule 1A becomes closer to the direction of the electric field at the electrode 7A side, while the molecular axis of the liquid crystal molecule 1A remains substantially parallel to the electrode film 6 at the electrode 7B side since the electric field strength is substantially zero.

The permittivity of the liquid crystal molecule 1A is great in the directions parallel to its molecular axis and small in the directions perpendicular to its molecular axis. Accordingly, the refractive index becomes greater in the direction parallel to the molecular axis. Since the molecular axis of the liquid crystal molecule 1A distributes as described above, the refractive index of the liquid crystal 1 becomes high at the electrode 7A side where the molecular axis is substantially parallel to the electric field, and low at the electrode 7B side where the molecular axis is substantially perpendicular to the electric field. The refractive index linearly decreases from the electrode 7A side to the electrode 7B side.

Accordingly, when the refractive index of the liquid crystal deflecting element is distributed as described above, a light beam incident on the liquid crystal deflecting element from the left side of FIG. 2B is deflected towards the high refractive index side (the upper side of FIG. 2B) due to the distribution of the refractive index.

When the electrode 7A, instead of 7B, is grounded, and an opposite voltage is applied between terminals A and B, the refractive index decreases from the electrode 7B side to the electrode 7A side, and the transmitting light beam is deflected downwards in FIG. 2B due to the distribution of the refractive index.

The liquid crystal deflecting element bends a light beam using the distribution of the refractive index as described above.

The amount of deflecting, that is, a "deflecting angle", saturates at an intrinsic value for each liquid crystal deflecting element. The deflecting angle does not exceed the saturation value. The liquid crystal element may be driven with a direct voltage signal. However, a pulse signal or a sine wave signal of which average voltage is near zero is preferred so as to extend the life of the liquid crystal deflecting element.

In the case that the pulse signal is applied to the liquid crystal deflecting element, the deflecting angle depends on the duty ratio of the pulse signal as well as the voltage V between the terminals A and B.

Figure 2D:
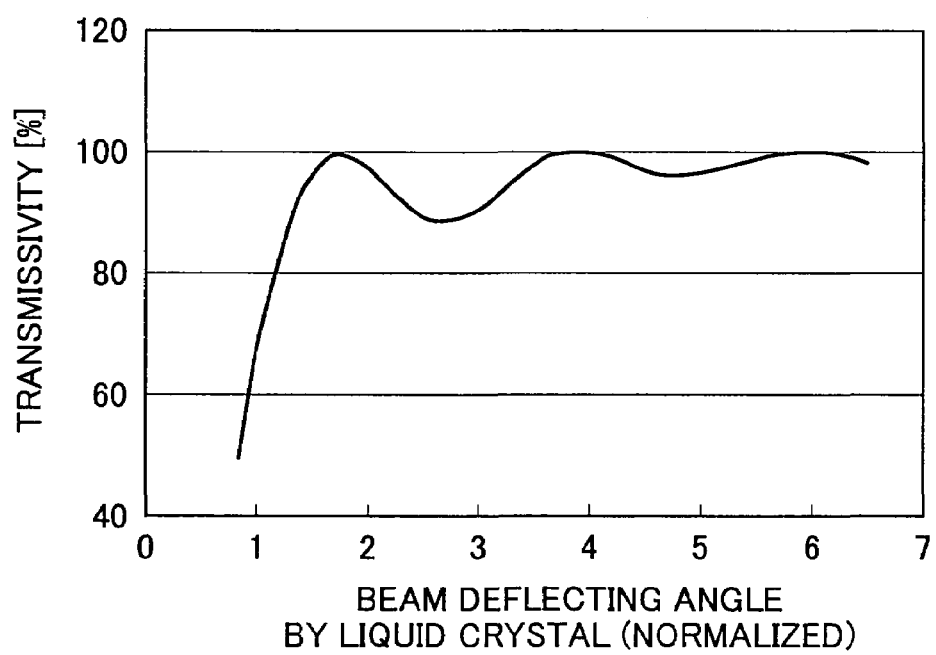

In the case of the nematic type liquid crystal deflecting element described above, the light beam is deflected by changing the driving voltage applied to the liquid crystal 1 so as to change the anisotropy in refractive index Δn (=ne−no) of a regular light beam and an irregular light beam and consequently change the refractive index. The transmissivity cyclically changes depending on the deflecting angle of the light beam due to the anisotropy as shown in FIG. 2D.

The transmissivity T of the light beam transmitting through the liquid crystal 1 is:

$$T=1-[\sin^2[(\pi/2)(1+u^2)^{1/2}]]/(1+u^2), \text{ and}$$

$$u=2*\Delta n*d*\lambda$$

with d indicating the thickness of the liquid crystal 1, λ being the wavelength of the light beam, and Δn indicating the above anisotropy. Strictly speaking, the x-axis of a graph shown in FIG. 2D indicates the above variable "u".

In the case that the liquid crystal deflecting elements are used as the beam deflecting units 40a and 40b, the control unit 10 determines a deflecting angle by which the light beam is to be deflected and controls the driving voltage to be applied to the beam deflecting units 40a and 40b. Because the transmissivity of the light beam that transmits through the beam deflecting units 40a and 40b can be obtained based on the above theoretical expression, one can prepare a table for obtaining the compensatory amount of the light intensity based on the deflecting amount of the light beam. The control unit 10 can determine the compensatory amount based on the above table and controls the emission intensity of the semiconductor lasers 10a and 11b with the driver circuits 11a1 and 11b1. In this case, in theory the light sensor 19 does not need to detect the light intensity of the light spot.

The actual transmissivity of the liquid crystal may vary due to dispersion or degrading over time of parts and assembly forming the actual light scanning apparatus. Keeping this problem in mind, the light intensity of the light spot needs to be monitored by the light sensor 19 so as to compensate the light intensity.

It is not necessary to adjust the position of each scan line. Only the relative position of one scan line to the other scan line needs to be adjusted by using one beam deflecting unit either 40a or 40b ("N-1" beam deflecting units in the case of "N" light sources). In this case, the light intensity of only one semiconductor laser needs to be adjusted.

The case in which the liquid crystal deflecting element is used as the light spot position adjusting unit is described above. The light spot position adjusting unit is not limited to the liquid crystal deflecting element and variations may be made.

For example, a cylindrical lens may be provided for each light beam that converges the light beam into a linear image on the deflecting reflective face position of the polygon mirror, and is rotated around an axis parallel to the main-scan directions. The cylindrical lens may be shifted in the sub-scan directions. An electro-optical element or acoustic-optical element (AOM) may be used instead of the cylindrical lens. A transparent parallel plate may be provided between the semiconductor laser and the coupling lens and be rotated around an axis parallel to the main scan directions.

Although not shown in FIG. 1, an aperture for beam shaping is generally used in the light scanning apparatus. In the case that this aperture is provided between the semiconductor laser and the beam deflecting unit, the deflecting of the light beam in the sub-scan directions does not affect the blocking of the light beam by this aperture.

In the case that the aperture is provided between the beam deflecting unit and the polygon mirror, the light beam moves in the sub-scan directions at the aperture due to the deflecting by the beam deflecting unit, and the amount of the light beam blocked by the aperture changes as the light beam is deflected.

The above change in the light intensity of the light spot may be compensated by controlling the emission intensity of the semiconductor laser. However, since the function of the aperture for beam shaping is to form a light spot of a desired shape on the scanned face, a more preferable method to solve this problem may be to provide a unit for shifting the aperture for beam shaping in the sub-scan direction so as to shift the aperture in the sub-scan direction, and to cause the deflected light beam to always pass through the center of the aperture.

The compensation of the light intensity of the light spot due to the disposition of the aperture is described below with reference to FIG. 3.

Figure 3A:
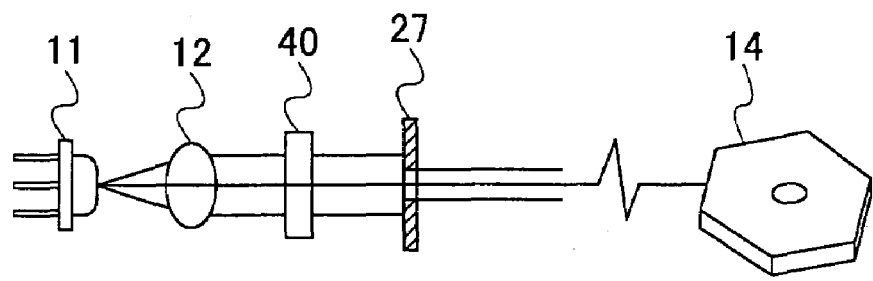
FIGS. 3A–3C are schematic diagrams showing a light intensity compensating unit according to an embodiment.
Figure 3B:
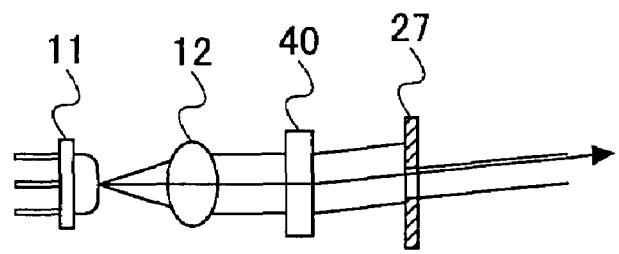
Figure 3C:
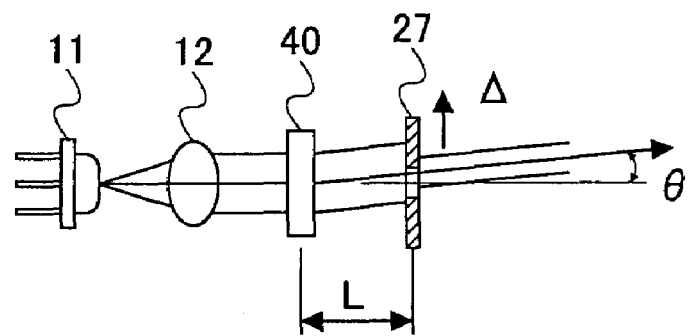

FIGS. 3A–3C show an aperture for beam shaping 27 provided between the beam deflecting unit 40 and the polygon mirror 14. Although the cylindrical lens 13 is not shown, the aperture 27 is provided at the cylindrical lens 13 side of the beam deflecting units 40a and 40b. Reference numerals are generalized. For example, the reference numerals 11, 12, and 40 denote reference numerals 11a, 12a, 40a or 11b, 12b, 40b.

FIG. 3A shows a state in which the beam deflecting unit 40 does not bend the light beam. The emission source of the semiconductor laser 11 and the center of the aperture 27 are on the light axis of the coupling lens 12. Accordingly, the principal ray of the light beam emitted by the semiconductor laser 11 matches the light axis of the coupling lens 12 and goes through the center of the aperture 27.

FIG. 3B shows a state in which the beam deflecting unit 40 bends the light beam in the sub-scan directions (the vertical directions of FIG. 3B). In this case, if the aperture 27 remains at the same position as FIG. 3A, a portion of the deflected light beam (of which power distribution is Gaussian symmetric to the optical axis ray) is blocked by the aperture 27. As a result, the amount of light transmitted to the polygon mirror side decreases, and the light intensity of the light spot decreases.

To solve this problem, when the beam deflecting unit 40 bends the light beam, the aperture 27 is shifted by a distance Δ depending on the beam deflecting angle θ so that the principal ray of the deflected light beam goes through the center of the aperture 27. The shifted distance Δ of the aperture 27 can be obtained by Δ=L*tan θ, where "L" is the distance between the beam deflecting unit 40 and the aperture 27.

The change in the light intensity of the light spot caused by the aperture 27 blocking the light beam can be compensated by shifting the aperture 27 as described above. There still remains the change in the light intensity of the light spot caused by the beam deflecting unit 40 of which transmissivity changes, and this change can be compensated by adjusting the emission intensity of the semiconductor laser 11 as described above.

Another example of the beam deflecting unit (the light spot position adjusting unit) is described with reference to FIGS. 4A and 4B. According to this example, a semiconductor laser, a coupling lens, and an aperture for beam shaping are integrated with a holder. The aperture is positioned so that a light beam emitted by the semiconductor laser that goes through the center of the coupling lens further goes through the center of the aperture.

As shown in FIGS. 4A and 4B, the semiconductor laser 11, the coupling lens 12, and the aperture 27 for beam shaping are integrated by a holder HL that fits with a housing HOU in which the other optical system is provided.

The semiconductor laser 11, the coupling lens 12, and the aperture 27 integrated by the holder HL are mutually positioned as described below.

The emission source of the semiconductor laser 11 is eccentric by a predetermined small distance (to the direction perpendicular to FIG. 4A) from the optical axis of the coupling lens 12. The semiconductor laser 11 is press fitted to the holder HL. The coupling lens 12 is attached after the relative position of the coupling lens 12 to the semiconductor laser 11 is adjusted.

Because the emission source of the semiconductor laser 11 is eccentric (offset) from the optical axis of the coupling lens 12, a ray transmitting through the center of the coupling lens 12 among the light beams emitted by the semiconductor laser 11 and passing through the coupling lens is tilted relative to the optical axis of the coupling lens 12.

The aperture 27 is positioned so that the light beam emitted by the semiconductor laser 11 and passing through the center of the coupling lens 12 goes through the center of the aperture 27.

The holder HL fitted to the housing HOU is rotatable on an axis parallel to the optical axis of the coupling lens 12 and going through the emission source of the semiconductor laser 11. FIG. 4B shows a state in which the holder HL is rotated. When the holder HL is rotated, the directions of the ray (shown by a line) passing through the center of the coupling lens 12 changes around the above rotative axis like a precession. The light beam is deflected by this change in direction.

The positional relationship among the semiconductor laser 11, the coupling lens 12, and the aperture 27 is fixed by the holder HL. Even if the light beam is deflected, the ray passing through the center of the coupling lens of the deflected light beam always goes through the center of the aperture 27. The amount of the deflected light beam blocked by the aperture 27 does not change.

The aperture 27 is displaced keeping the same positional relationship among the aperture, the semiconductor laser, and the coupling lens. This construction corresponds to the light intensity compensating unit.

The aperture 27 is integrated with the semiconductor laser 11 and the coupling lens 12 by the holder in the embodiment shown in FIG. 4, but the aperture 27 may be separated. In this case, the aperture 27 is displaced following a circular displacement trace with another displacement mechanism so that the ray passing through the center of the coupling lens goes through the center of the aperture.

In the case of the embodiment shown in FIG. 4, since the light beam is deflected around the rotational axis like a precession as the holder HL rotates, the light spot position displaces in the main scan directions as well as the sub-scan directions. In practice, the displacement in the main scan directions is so small that the scan line pitch can be compensated by compensating the displacement component in the sub-scan directions.

The effect of the displacement of the light spot in the main scan directions is removable by detecting synchronization. In the case that the displacement to the main scan directions effects the compensation of the scan line pitch, the above liquid crystal deflecting element, for example, is provided to adjust the light spot position in the main scan directions and to compensate the displacement of the light spot in the main scan directions due to the rotation of the holder.

The light intensity compensating unit that controls the emission intensity of the semiconductor laser, that displaces the aperture, and that integrates the aperture with the rotation of the semiconductor laser and the coupling lens, for example, are described above. The light intensity compensating unit is not limited to these examples and variations may be made. For example, a light intensity compensating unit in which a transmissivity adjusting unit is provided between the light source and the light deflecting unit can be provided.

FIG. 5 shows the case in which the above light intensity compensating unit is applied to the embodiment shown in FIG. 1. The construction beyond the polygon mirror is the same as FIG. 1A.

As shown in FIG. 5, transmissivity adjusting units 43a and 43b (light intensity compensating unit) are provided in the light path of the light beam transmitted by the beam deflecting units 40a and 40b.

The transmissivity adjusting units 43a and 43b make the light intensities of the light spots on the scanned face substantially equal by adjusting the transmissivity of the light beams. There are various transmissivity adjusting units.

The light beams emitted by the semiconductor lasers 11a and 11b are substantially linearly polarized. The transmissivity of the light beam can be adjusted by rotating a polarizer (used as the transmissivity adjusting units 43a and 43b) with a driving unit (not shown) of which driving amount is determined by the control unit.

A rotative gradation ND filter of which transmissivity changes with gradation as it is rotated may be used as the transmissivity adjusting units 43a and 43b. The transmissivity may be adjusted by rotating the rotative gradation ND filter with a not shown driving unit.

If the light intensities of light spots need to be mutually equal, only one transmissivity adjusting unit may suffice.

There are liquid crystal deflecting elements that use diffraction instead of the change in refractive index to bend the light beam. In the case that such a liquid crystal deflecting element is used as a beam deflecting unit, the transmissivity can be adjusted by changing the pitch of diffraction lattice and, consequently, the diffraction efficiency.

In this case, a transmissivity adjusting unit 43a or 43b may be provided on at least one of the two light paths.

An example in which beam deflecting units such as the liquid crystal deflecting elements are provided between the light source and the light deflecting unit is described above. A case is described below in which a liquid crystal deflecting element array of a plurality of liquid crystal deflecting elements arranged in the main scan directions, each liquid crystal deflecting element having a function to bend the light beam in the sub scan directions, is provided between the light deflecting unit and the scanned face as the light spot position adjusting unit or a portion thereof.

In the case that the beam deflecting unit is provided between the light source and the light deflecting unit, the compensation of scan line pitch is possible, but the compensation of a deflected scan line is difficult. However, in the case that the liquid crystal deflecting element array is provided between the light deflecting unit and the scanned face, the compensation of the deflected scan line (including the tilt scan line) is possible, but the compensation of the scan line pitch is difficult.

Accordingly, the method that uses only the liquid crystal deflecting element array as the light spot position adjusting unit is appropriate for the case of a tandem type image forming apparatus in which each photosensitive body is scanned with the single beam scan method or each photo sensitive body is scanned with the multi-beam scan method using multiple light beams from a semiconductor laser array (the change in scan line pitch can be compensated by rotative adjustment of the light source in this case).

Figure 6:
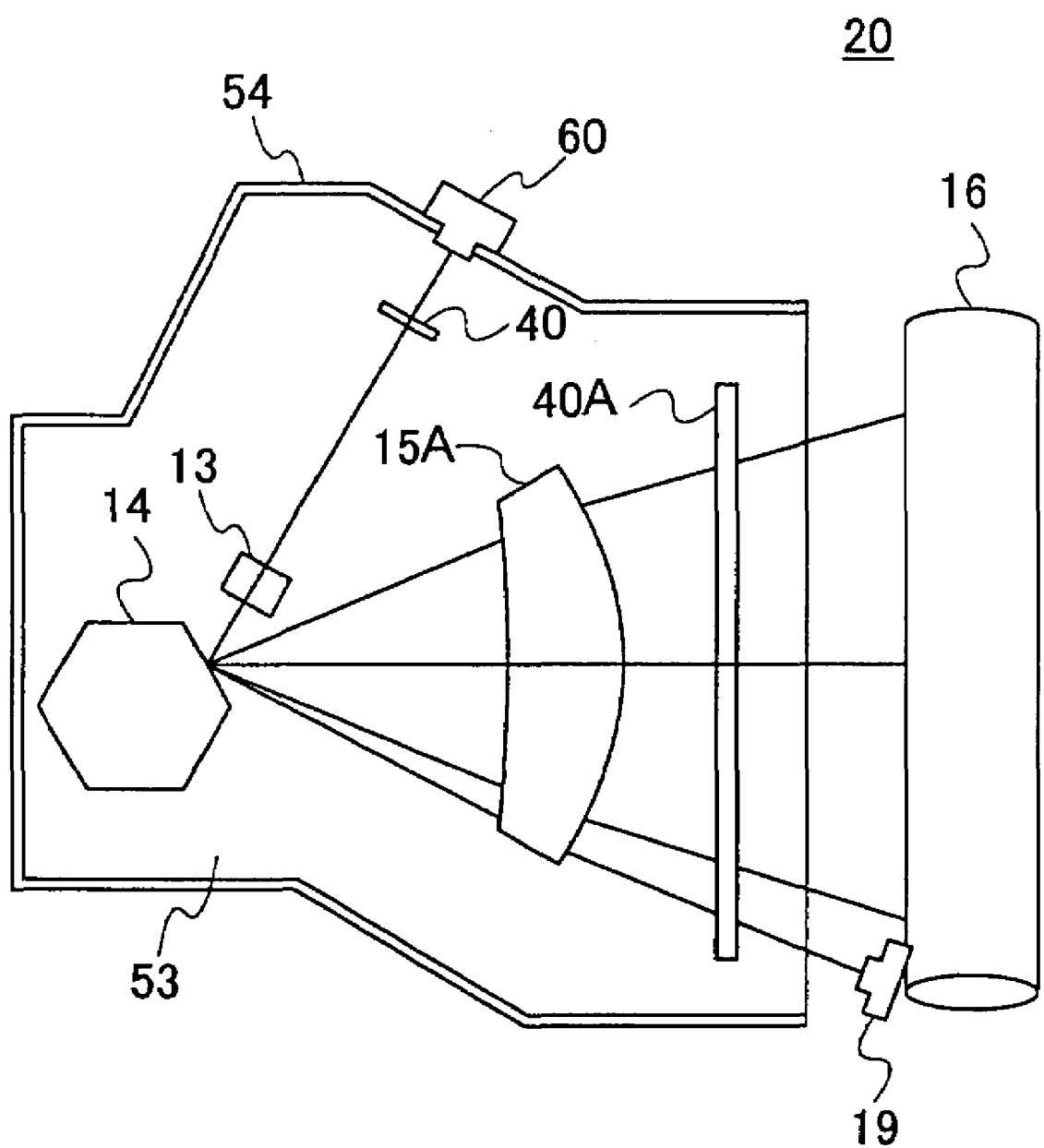
FIG. 6 is a schematic diagram showing a light scanning apparatus according to another embodiment of the present invention.

FIG. 6 is a schematic diagram showing an embodiment of a light scanning apparatus 20. The components that are shown above in FIG. 1 are referred to by the same reference numerals to make the following description simple in principle.

A reference numeral 60 denotes a light source unit. The light source unit includes a semiconductor laser, a coupling lens, and an aperture for beam shaping. The light source unit emits a parallel and shaped light beam.

The light beam emitted by the light source unit 60 passes through a beam deflecting unit 40 (identical to the beam deflecting units 40a and 40b described with reference to FIG. 1), and converged by a cylindrical lens 13 into a long linear image in the main scan directions on a deflecting reflective face position of the polygon mirror 14. The light beam is deflected as the polygon mirror 14 rotates, and forms a light spot on a drum-shaped photosensitive body 16, which is an embodiment of the scanned face, for performing a single beam scan.

A light sensor 19 is the same as the light sensor 19 showed in FIG. 1B. The light sensor 19 detects the light intensity of the light spot and the position of the scan line in the sub-scan directions (to be obtained by detecting the difference in time at which two PIN photo diodes detect the scan line). The light sensor 19 also provides synchronization to start the scan.

The light beam passes through a scan convergence optical system 15A and a liquid crystal deflecting element array 40A. Although not shown in FIG. 6, a fraction (detection light beam) of the light beam passing through the liquid crystal element array 40A is separated by a half mirror, for example, from the light path to the photo sensitive body, and is led to a scan line bend detecting unit (not shown).

In this embodiment, the scan line position in the sub scan directions is compensated by deflecting the light beam in the sub scan directions by the beam deflecting unit 40, and the scan line bend including tilt is compensated by the liquid crystal deflecting element array 40A.

Light spot position adjustment by the liquid crystal deflecting element array 40A is described with reference to FIG. 7.

Figure 7A:
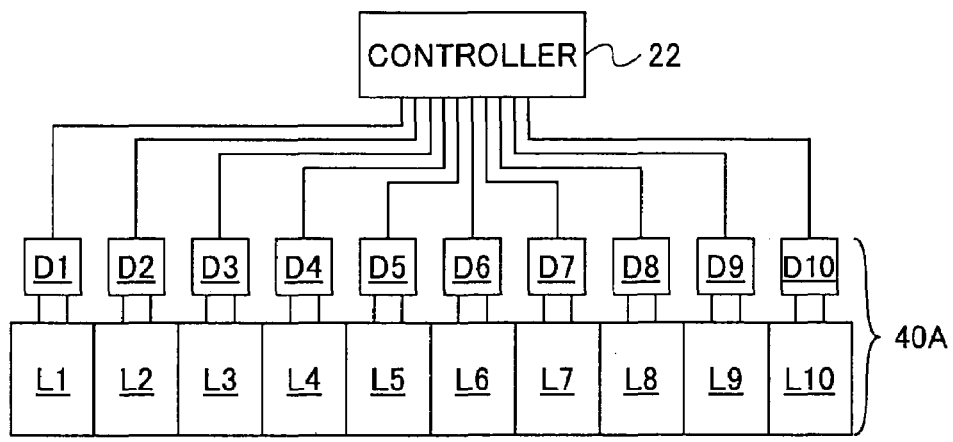
FIGS. 7A–7D are schematic diagrams for explaining the compensation of scan line bend by a liquid crystal element array.

In FIG. 7A, the horizontal directions are the main scan directions. Reference numerals Li (i=1–10) denote electrically driven liquid crystal deflecting elements. That is, 10 liquid crystal deflecting elements L1–L10 are closely and continuously provided in the main scan directions in this embodiment. Each liquid crystal deflecting element Li of this embodiment is of the same size and of the same pitch. Each liquid crystal deflecting element Li may be of the same type as described above with reference to FIG. 2.

Reference numerals Di (i=1–10) denote driver circuits that drive the liquid crystal deflecting elements Li. The driver circuits Di are controlled by a controller 22. The controller 22 may be the control unit 10 shown in FIG. 1. The deflecting direction of the liquid crystal deflecting elements Li is set in the sub scan directions.

It is noted that, although each liquid crystal deflecting element Li is independently driven by the corresponding driver circuit Di, liquid crystal, orientation films sandwiching the liquid crystal, and transparent electrodes are common for all liquid crystal deflecting elements Li. Only the electrodes to which driving voltages are applied and transparent resistance films connecting the transparent electrodes are separated by a liquid crystal deflecting element Li (i=1–10).

Figure 7B:
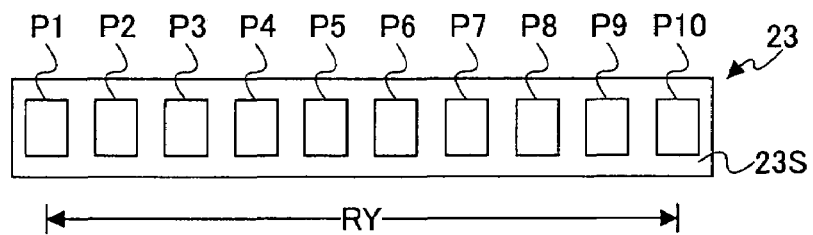

FIG. 7B shows an embodiment of the scan line bend detecting unit described above. As described above, the fraction (detection light beam) of the light beam that has passed through the liquid crystal deflecting element array 40A is separated from the light path to the photo sensitive body 16 and is led to a scan line bend detecting unit 23.

Although not shown in FIG. 6, the scan line bend detecting unit is positioned at an optically equivalent position to the photosensitive body 60 in connection with the detection light beam. Accordingly, the detection light beam is converged into a light spot on the photo reception face of the scan line bend detecting unit.

The scan line bend detecting unit 23 shown in FIG. 7B is provided with light reception faces of area sensors P1–P10 of which quantity is the same as that of the liquid crystal deflecting elements Li, the light reception faces being arrayed in the main scan directions. The light reception face of each area sensor Pi is disposed at an optically equivalent position to the scanned face (the photosensitive face of the photosensitive body 16). The detection light beam separated from the deflected light beam scans the light reception faces.

The light reception faces of the area sensors Pi correspond to the liquid crystal deflecting elements Li of the liquid crystal deflecting element array 40A. The light reception face of the area sensor Pi and the corresponding liquid crystal deflecting element Li are mutually positioned so that the deflected light beam theoretically passes through the center of the liquid crystal deflecting element Li and converges into the light spot at the center of the area sensor Pi.

The area sensors Pi are fixed on a fixing plate 23S. The fixing plate 23S is made of materials of which thermal coefficient of expansion is $1.0 \times 10^{-5}/°$ C. or less, such as glass (thermal coefficient of expansion: $0.5 \times 10^{-5}/°$ C.), ceramic material (thermal coefficient of expansion: $0.7 \times 10^{-5}/°$ C.), and silicon carbide (for example, alumina; thermal coefficient of expansion: $0.4 \times 10^{-5}/°$ C.) so that the fixing plate 23S is not substantially affected by the change in temperature. Otherwise, the detection by the area sensors Pi becomes inaccurate due to the disposition of the light reception face and the change in mutual positional relationship between the area sensors Pi and the corresponding liquid crystal deflecting elements Li.

Additionally, the fixing plate 23S is desired to be made of nonconductive material as described above to avoid electric noise being caused among the area sensors Pi. A region RY shown in FIG. 7B is a region corresponding to the effective writing width of the scanned face.

A case is described below in which the scan line bend is compensated by the liquid crystal deflecting element array 40A.

For example, before an image forming process by optical scanning, the polygon mirror 14 is rotated and the light source unit 60 is activated. The light source is intermittently caused to emit the light beam so that the detection light beam of each emission comes to each area sensor P1–P10 of the scan line bend detecting unit 23. The scan line bend detecting unit 23 outputs the position of the light spot in the sub scan directions detected by the area sensors Pi (i=1–10).

Figure 7C:
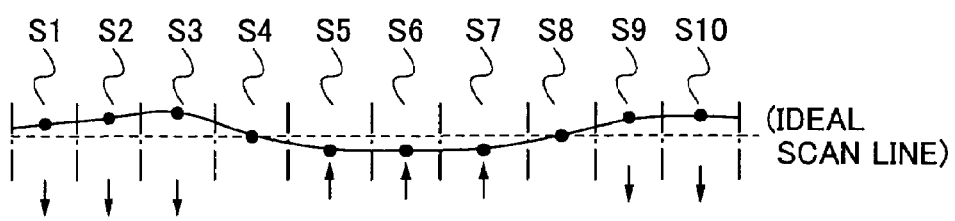

In FIG. 7C, ten black dots indicate detected positions of the light spots. The dotted line indicates an ideal scan line that is linear in the main scan directions. The controller 22 approximates the actual scan line including the ten light spot positions in the sub scan directions with a polynomial using the method of least squares, for example. The polynomial is a detected scan line bend, which is shown by the solid line in FIG. 7C.

The controller 22 calculates the deflecting direction and the deflecting angle in the sub scan directions at the liquid crystal deflecting element Li of the sub scan liquid crystal deflecting element array 40A in order to compensate such a scan line bend. In FIG. 7C, regions Si (i=1–10) indicate regions (allocated compensation regions) in which the liquid crystal deflecting element Li of the sub-scan liquid crystal deflecting element array need to bend the light beam, and upward or downward arrows in the regions Si indicate the directions of deflecting.

The controller 22 determines a signal with which a liquid crystal deflecting element Li is to realize the above deflecting direction and the deflecting angle, and applies the signal to the driver circuit Di (i=1–10). In this example, the deflecting direction is controlled by selecting the polarization of the voltage to be applied to the liquid crystal deflecting element Li and the electrode to be grounded. The deflecting angle is controlled by applying pulse voltages of that voltage and adjusting its duty ratio.

As described above, before the image forming process is started, an adjusted deflecting amount of the liquid crystal deflecting element Li (i=1–10) of the liquid crystal deflecting element array 40A is realized. Of course, in the case that the detected scan line bend is so small that no compensation is required, the compensation of the scan line bend of the sub scan liquid crystal deflecting element array is not required.

Figure 7D:
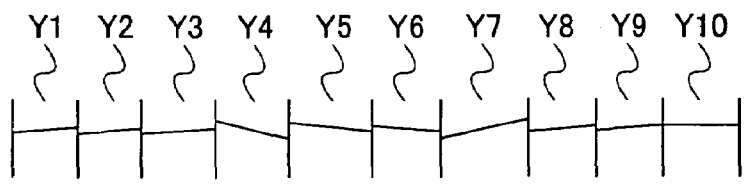

FIG. 7D shows a state of scan line compensated by the sub scan liquid crystal deflecting element array. Yi (i=1–10) denotes a portion (compensation allocated region) in the scan region of the scanned face to which each liquid crystal deflecting element Li is assigned and responsible for compensation.

The scan line indicated in FIG. 7D may appear a little "staggered" since the scan line bend is extremely emphasized in FIG. 7C, but the scan line bend in practice is within the range of 0.1–0.2 mm. Even if one liquid crystal deflecting element Li is assigned to a scan region of 30 mm, the scan line becomes substantially linear.

It is noted that, if the number of liquid crystal deflecting elements in the sub scan liquid crystal deflecting element array is further increased, and the allocated compensation region of the liquid crystal deflecting element Li becomes smaller, the compensation of the scan line bend becomes more accurate.

Especially, if the width of the sub scan liquid crystal deflecting element Li in the direction of main scan directions in the sub scan liquid crystal element array is small enough (2–5 mm, for example), the change in deflecting amount between adjacent liquid crystal deflecting elements becomes substantially equal, and consequently, the scan line becomes a substantially continuous straight line.

Those skilled in the art easily recognize that the tilt of the scan line, which is an aspect of the scan line bend, can be compensated in the same manner.

As described above, the scan line bend detecting unit detects the scan position of the light spot to identify the scan line bend to be compensated. The adjusted deflecting amount of the liquid crystal deflecting element Li is set based on the determination. Accordingly, even in the case that the scan line bend changes over time, or the fθ lens is constructed by a resin lens and the scan line bend changes due to environmental change, the change can be appropriately compensated by regularly performing the scan position detection.

According to an embodiment shown in FIGS. 1, 3, 4, 5, and 6, a light scanning method is provided in which a scanned face is scanned by a light beam by deflecting the light beam emitted by a light source using a light deflecting unit, and forming a light spot by converging the emitted light beam on the scanned face. The position of the light spot on the scanned face is adjustable using a light spot position adjusting unit, and the change in the light intensity of the light spot caused by the adjustment of the position of the light spot by the light spot position adjusting unit is compensated using a light intensity compensation unit.

According to an embodiment shown in FIGS. 1, 3, and 4, light spot position adjusting units 40a, 40b, and 40, for example, are provided between the light source and the light deflecting unit 14 to adjust the scan line pitch of the multi-beam scan method.

According to the light scanning apparatus of which an embodiment is shown in FIG. 6, the light spot position adjusting unit 40A is provided between the light deflecting unit 14 and the scanned face 16 to compensate the scan line bend.

An embodiment of a n image forming apparatus is described below.

Figure 8:
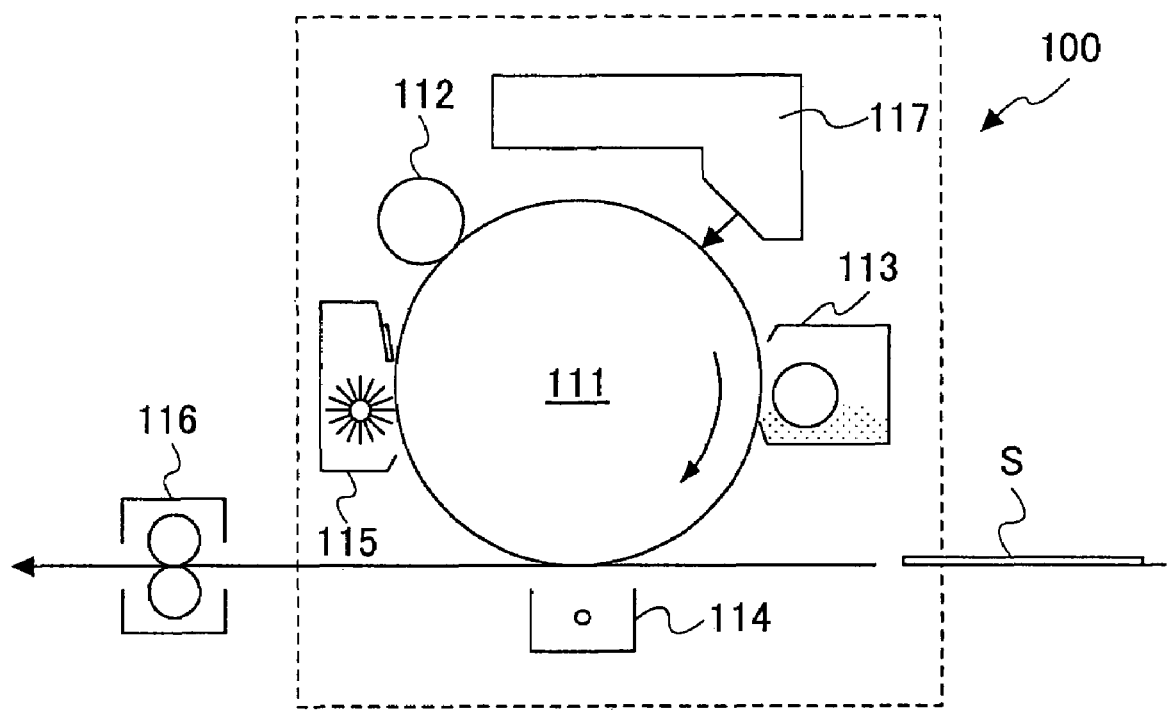
FIG. 8 is a schematic diagram showing an image forming apparatus according to an embodiment of the present invention.

FIG. 8 shows an embodiment of the image forming apparatus. The image forming apparatus 100 is a monochrome laser printer. A photosensitive body 111 provided in the image forming apparatus 100 is made of photo conductive material. Electrostatic latent images formed by light scanning are made visible as toner images, and the toner images are transferred and fixed.

The laser printer includes a drum-shaped photo conductive photosensitive body as the photosensitive body 111. Around the photosensitive body 111, there are provided a charging roller 112 (charging unit), a development apparatus 113, a transfer charger 114, and a cleaning apparatus 115. The charging unit may be a corona charger or a charging brush instead of the charging roller. The transfer charger 114 may be substituted for by a contact-type transferring unit such as a transfer roller.

A light scanning apparatus 117 is provided between the charging roller 112 and the development apparatus 113, and exposes the photosensitive body 111 by light scanning. A reference numeral 116 indicates a fixing apparatus, and a reference numeral "S" indicates a sheet of transfer paper (record sheet).

In an image forming process, the photo conductive photosensitive body 111 is rotated counter-clock wise, and its surface is evenly charged by the charging roller 112. An electrostatic latent image is formed by the light beam from the light scanning apparatus 117. The formed electrostatic latent image is a so-called "negative latent image" of which an image portion is exposed to the light beam. This electrostatic latent image is reverse developed by the developing apparatus 113, and the toner image is formed on the photosensitive body 111.

When the toner image on the photosensitive body 111 moves to a transfer position, the transfer sheet S is sent to a transfer unit (not showed). The toner image is superposed and transferred to the transfer sheet S by the transfer charger 114. The transfer sheet S on which the toner image is transferred is sent to the fixing apparatus 116. After the toner image is fixed by the fixing apparatus 116, the transfer sheet S is discharged out of the image forming apparatus. After the toner image is transferred, the surface of the photosensitive body 111 is cleaned by the cleaning apparatus 115 so as to remove remaining toner and paper powder, for example.

The light scanning apparatus 117 may be the light scanning apparatus with the multi-beam scanning method described with reference to FIG. 1, for example. In this case, the change in time in the scan line pitch, for example, can be appropriately compensated, and the light intensity of the light spot of each scan line can be kept substantially at the same level, which results in preferable image forming.

That is, the image forming apparatus shown in FIG. 8 in which the light scanning apparatus of FIG. 1 is used is an embodiment of the image forming apparatus according to claim 4 that writes an image on the photosensitive body 111. The photosensitive medium 111 is a photoconductive photosensitive body, and electrostatic latent images formed by the light scanning is are made visible as toner images.

Figure 9:
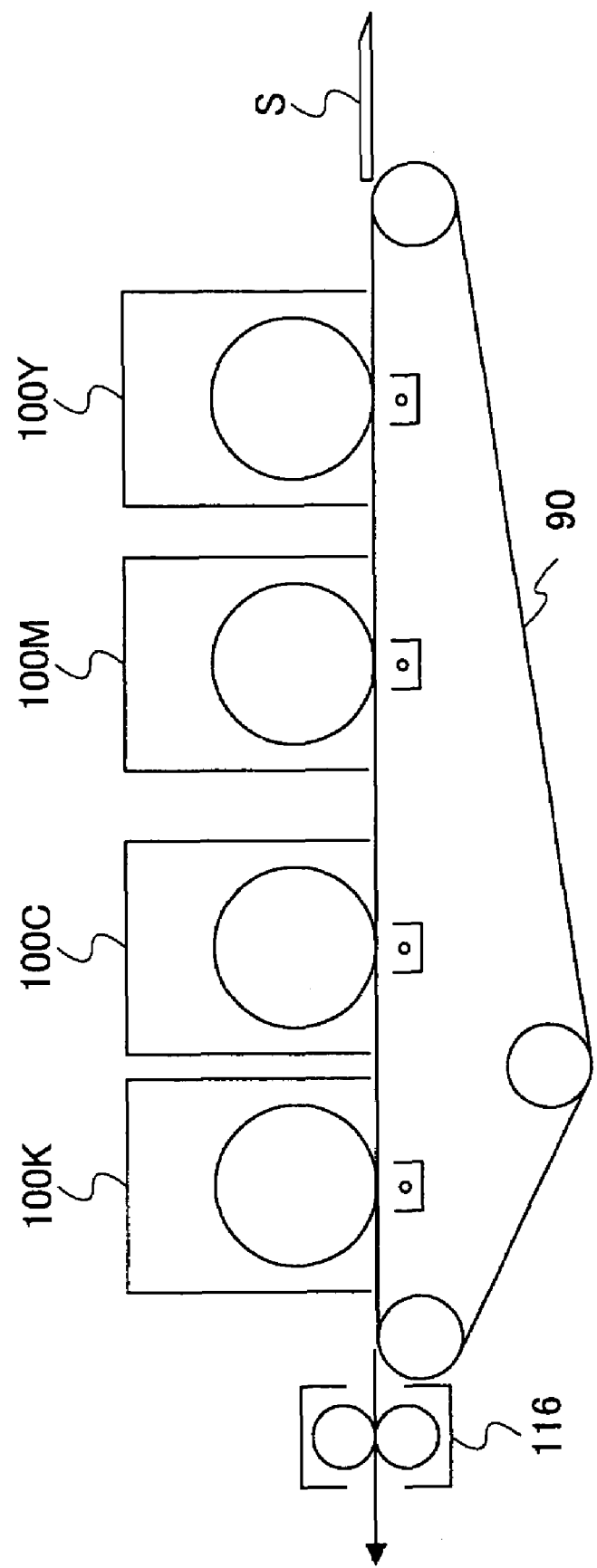
FIG. 9 is a schematic diagram showing an image forming apparatus according to another embodiment.

FIG. 9 shows a tandem type color image forming apparatus according to another embodiment of the present invention. A portion of FIG. 8 referred to by the reference numeral 100 (the portion surrounded by a dotted line) is called as an "image forming unit". The tandem type color image forming apparatus shown in FIG. 9 is provided with four image forming units 100Y, 100M, 100C, and 100K arrayed along the path of the transfer sheet S (toner image transfer medium).

Each image forming unit 100Y–100K is identically structured to the image forming unit 100 shown in FIG. 8. The color of toner used in each image forming unit is different. That is, the image forming unit 100Y develops with yellow toner, and the image forming unit 100M, 100C, and 100K develop with magenta, cyan, and black toner, respectively.

The light scanning apparatus used in each image forming unit may be that described above with reference to FIG. 6. In these image forming units, each photosensitive body is scanned with a single beam, but the scan line position in the sub scan directions and the scan line bend are compensated by an image forming unit. Accordingly, the positional relationship between the scan lines of the image forming unit and the scan line bend can be compensated, which results in preferable color images without color distortion and color phase change.

That is, the image forming unit 100Y forms an electrostatic latent image of yellow component on the photosensitive body and makes visible the electrostatic latent image with yellow toner into a yellow toner image. Likewise, the image forming units 100M, 100C, and 100K form electrostatic latent images of magenta, cyan, and black components, respectively, on the photosensitive body and make visible the electrostatic latent image with corresponding color toners.

The transfer paper S is carried from the right side of the drawing to the left side by a carrier belt 90. While the transfer paper S is carried, the yellow toner image, the magenta toner image, the cyan toner image, and the black toner image are transferred on the transfer paper S. The toner images are superposed on the transfer paper S to form a multi-color image, and fixed by the fixing apparatus 116.

That is, the image forming apparatus shown in FIG. 9 is provided with one or more drum-shaped photosensitive bodies arrayed along the path of toner image transfer medium S. The toner image formed on each photosensitive body is transferred on the common recording sheet S to obtain the multi-color image (tandem type image forming apparatus). An embodiment of the light scanning apparatus according to claim 6 is used in this image forming apparatus (claim 16). Four photosensitive bodies are provided, and color images can be formed using the toners, magenta, cyan, yellow, and black (claim 17).

In the above description of the embodiment of the photo scanning apparatus of the multi-beam scanning method, the case of a dual scan line simultaneous scanning method that uses light beams from two semiconductor lasers is described. The present invention, however, is not limited to these embodiments. The present invention is also applicable to such a case that three or more scan lines are simultaneously scanned using three or more pairs of semiconductor lasers and coupling lenses.

As described above, the present invention provides a novel and useful light scanning method, light scanning apparatus, and image forming apparatus. According to the light scanning method and apparatus, the scan line pitch and the scan line bend can be adjusted. The change in the light intensity of the light spot due to the adjustment can be effectively compensated. Accordingly, even in the case of a multi-beam scanning method, the inequality of light intensity between scan lines can be effectively avoided. Likewise, even in the case of a tandem type image forming apparatus, the inequality of light intensity between photosensitive bodies can be effectively avoided. As a result, the image forming apparatus using such light scanning apparatus can form preferable images.

A light scanning apparatus and an image forming apparatus according to another embodiment of the present invention are further described with reference to FIG. 1A.

The light scanning apparatus is an apparatus that scans a scanned face with a light beam (laser beam) emitted by a light source, and includes a light source unit 18 provided with a light source, a cylindrical lens 13, a polygon mirror 14 that functions as a deflecting unit, a scanning optical system 15 including two plastic scan lenses and one reflecting mirror 153, and a photosensitive drum 16 of which surface is the scanned face.

FIG. 1A illustrates a two-beam light scanning apparatus that scans with two light beams simultaneously. The present invention is also applicable to light scanning apparatuses that scan with more light beams (multi-beam scanning apparatus).

Figure 10:
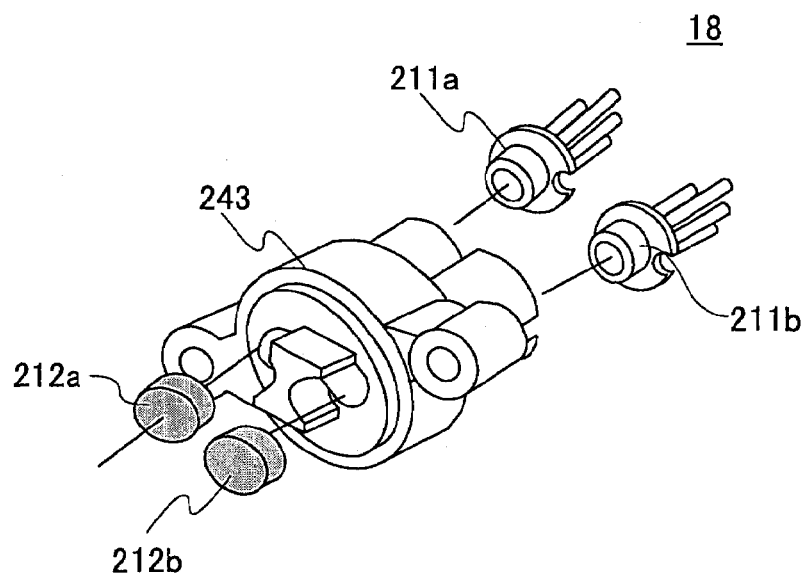
FIG. 10 is a exploded perspective view showing the structure of a light source unit provided to the light scanning apparatus according to an embodiment.

FIG. 10 is a schematic diagram showing the structure of the light source unit 18 shown in FIG. 1A. The light source unit 18 includes semiconductor lasers 211a and 211b and corresponding coupling lenses 212a and 212b fixed on a common base member 243. The semiconductor lasers 211a and 211b are press fit in the base member 243. On the other hand, the coupling lenses 212a and 212b may be attached to the base member 243. The position at which the coupling lens is fixed is adjusted depending on the property of the light beam transmitting through the coupling lens, that is, the parallelity and the outgoing optical axis directions.

In FIG. 1A, the light source unit 18 is structured so that two light beams 21a and 21b cross each other near the deflecting reflective face of the polygon mirror 14. Thanks to such a structure, it is possible to avoid a difference between the optical properties of the two light beams caused by the difference in the reflective positions of the polygon mirror 14, such as the position of convergence and the magnification. The main scan directions are the directions in which the beam spot scans the scanned face, and the sub scan directions are the directions perpendicular to the main scan directions.

Light beams emitted by the semiconductor lasers 11a and 11b are converted into parallel light beams 21a and 21b by the coupling lenses 40a and 40b, respectively. The two light beams 21a and 21b are converged in the sub scan directions into a long linear image in the main scan directions, and scan the scanned face of the photosensitive body drum 1 through a scanning optical system (scanning lens) 15.

The light scanning apparatus (multi-beam scanning apparatus) is often provided with a light beam position compensating unit that initially adjusts the scan line position on the scanned face (light beam position) and the beam spot pitch, and compensates changes caused by environmental reasons and/or elapsed time. The construction of a mechanical light beam position compensating unit is described below.

Figure 11:
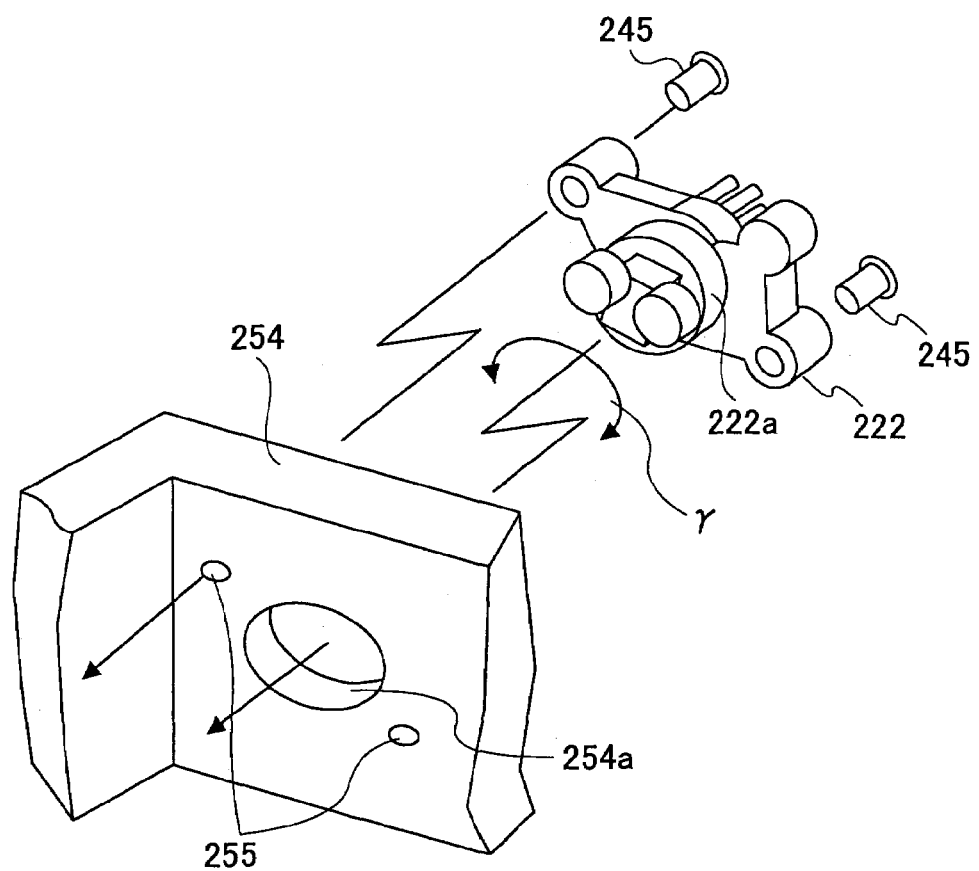
FIG. 11 is a exploded perspective view for explaining an attaching method of the light source unit to the side wall of the light scanning apparatus according to an embodiment.

FIG. 6 is a schematic diagram showing the optical disposition of a light scanning apparatus 20 stored in an optical housing 53, which is sectioned by a rotative plane of the polygon mirror. FIG. 11 is a schematic diagram for explaining a method of fixing the light source unit 18 to a side wall 54 (254) of the optical housing 53. As shown in FIG. 11, the light source unit 18 is fixed with a pair of screws 245 to the side wall 254 on which screw holes 255 are provided. At that time, the circular protruding unit 18a of the light source unit 18 is rotated in a circular fixing hole 254a provided on the side wall 254 in the rotative directions indicated by "γ" (γ rotation). The rotative directions "γ" are the rotative directions around the outgoing optical axis. Since, as described above, the two light beams 21a and 21b are not parallel, when the light source unit 18 is "γ" rotated, the relative optical axis directions of the two light beams in the sub scan directions change. As a result, the light beam position and the light beam spot pitch on the scanned face can be compensated.

However, if the light source unit 18 is attached to the side wall 254 of the optical housing 53 with the screws 245 after the light source unit 18 is "γ" rotated, the adjustment achieved by the "γ" rotation is often lost due to a torque applied when the screws are tightened. Conventionally, a process of the adjustment by "γ" rotation and the tightening of the screws needs to be repeated several times on a trial and error basis. If time allocated to the process is limited, a desired level of the adjustment may not be achieved.

Accordingly, in the case of the light scanning apparatus according to the present invention, the light beam position, that is, a scanning position, is compensated by an electrically driven liquid crystal element 40 besides the mechanical light beam position compensating unit. The liquid crystal element 40 can deflect the light beam by a small angle (several mrad, for example). If the liquid crystal element 40 is provided at any position between the coupling lenses 12a and 12b and the cylindrical lens 13 shown in FIGS. 1A and 6, the degree of freedom in mechanical layout design in the optical housing 53 can be increased.

Where the focal distance of the coupling lens is Fcol [mm]; the sub-scan magnification of the entire optical system is m [times]; the light deflecting angle (in the sub-scan sectional plane) of the liquid crystal element is θ [rad]; and the beam position varying (adjusting) amount on the scanned face is z [mm], the following equation is satisfied:

$$z = m * Fcol * \theta.$$

Accordingly, in the case of a light scanning apparatus of which Fcol=15 [mm], m=10 [times], if one desires to adjust the light scanning apparatus with a resolution of Δz=0.001 [mm]=1 [μm], the light path deflection by the liquid crystal element 40 is:

$$\begin{aligned}\Delta\theta &= z/Fcol*m\\ &= 0.001/15*10\\ &= 6.7\times 10^{-6} [\text{rad}]\\ &= 6.7\ [\mu\text{rad}].\end{aligned}$$

Figure 12A:
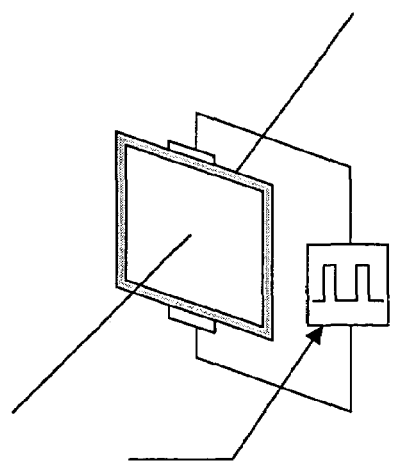
FIGS. 12A–12D are schematic diagrams for explaining the light path deflection of a light beam incident to a liquid crystal element.
Figure 12B:
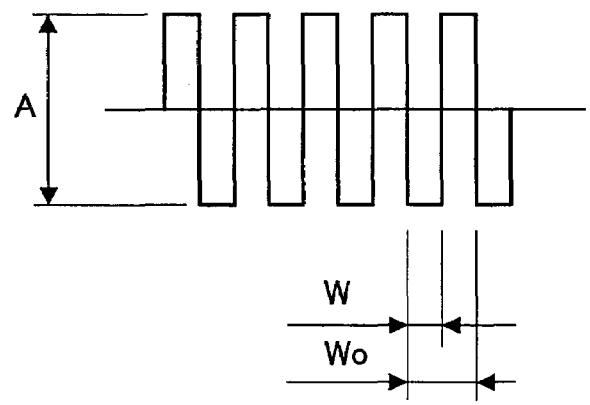

The liquid crystal element can be driven by a rectangular alternating voltage up to a frequency of several kHz. The light path can be deflected, that is the outgoing direction of the incident light beam can be deflected by changing effective voltage of the input signal pulse. FIG. 12A is a schematic diagram for explaining the deflection of the light beam by the modulation of the input signal pulse, and FIG. 12B is a schematic diagram for explaining an example of the reference input signal pulse.

Figure 12C:
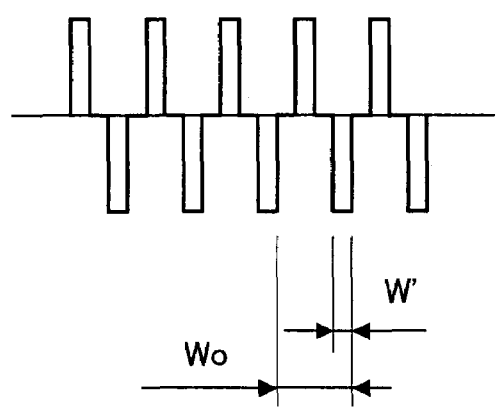
Figure 12D:
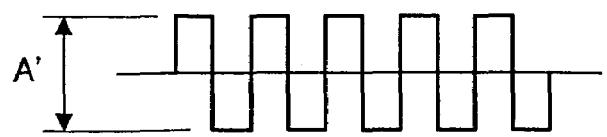

The effective voltage can be generally changed by changing pulse width (duty) as shown in FIG. 12C (W->W'), and changing pulse height (A->A') as shown in FIG. 8D. The refractive index gradient of the liquid crystal layer, and consequently, the deflecting angle of the light path can be controlled by changing the effective voltage as described above.

For example, in the case that the effective value is changed by changing the pulse height of the applied voltage, a liquid crystal that exhibits a light path deflecting angle of 3.0 [mrad] at an effective voltage of 2.0 volts, if the pulse height is modulated with a 10 bit comparator (1024 steps), can deflect the light path at an angle of 3.0 [rad]/1024 steps=2.93 [μrad] at an effective voltage of 2.0 [V]/1024 steps=1.95 [mV/step] (0.44 [μm] if converted to the beam position on the scanned face).

Accordingly, one can achieve a precise adjustment in a short time period by coarsely adjusting the light beam position (beam spot pitch) by the mechanical "γ" rotation of the light source unit 18 and subsequently fine adjusting the light beam position with the liquid crystal element. Accordingly, a memory unit is provided in the light scanning apparatus storing the electric signal that drives the liquid crystal element, and the driving voltage (effective value) that is used for fine adjusting is stored in this memory unit. When the light scanning apparatus is initialized on user's site, for example, the light scanning apparatus can reproduce the desired light beam position by retrieving the stored effective value from the memory unit. An operator does not need to repeat the beam position adjustment on a trial and error basis at the user's site.

In the case of the above light source unit 18, two pairs of semiconductor lasers 211a, 211b and coupling lenses 212a, 212b are fixed to the common base member 243. Because the coupling lenses 212a, 212b are attached to the base member 243 with adhesive material of from tens to hundreds of μm in thickness, the relative positional relationship between the semiconductor lasers and the coupling lenses may be affected by disturbances after the shipment from the factory. The disturbances include any cause that affects the light beam position on the scanned face including changes over time of material and assembly, vibrations during transportation and installation, and change in temperature and humidity, for example.

In the case that the relative positional relationship between the semiconductor lasers and the coupling lenses, especially in the sub scan sectional plane, changes, the light beam position on the scanned face changes. This change causes a change in pitch between two light beams (scan line pitch), which results in the degrading of output images.

To solve this problem, the change in the light beam position due to the disturbance is compensated using the above liquid crystal element to position the light beam with high accuracy.

In the embodiment described above, a liquid crystal element is provided to the light path of each light beam. If there are "N" light beams, "N" liquid crystal elements are required. Instead, one may regard one light beam as the reference, and provide a liquid crystal element to the light path of each light beam other than the reference light beam. Only "N-1" liquid crystal elements are required for "N" light beams in this case. The light beam position of the "N-1" light beams are adjusted to the reference light beam. The number of liquid crystal elements decreases.

A sensor for detecting the light beam position may be provided to the light scanning apparatus and the image forming apparatus so as to determine the compensation of the light beam position. If data to be required for the compensation are available theoretically or experimentally, a compensation table storing such data may be provided so as to determine the compensation based on the data.

Figure 13:
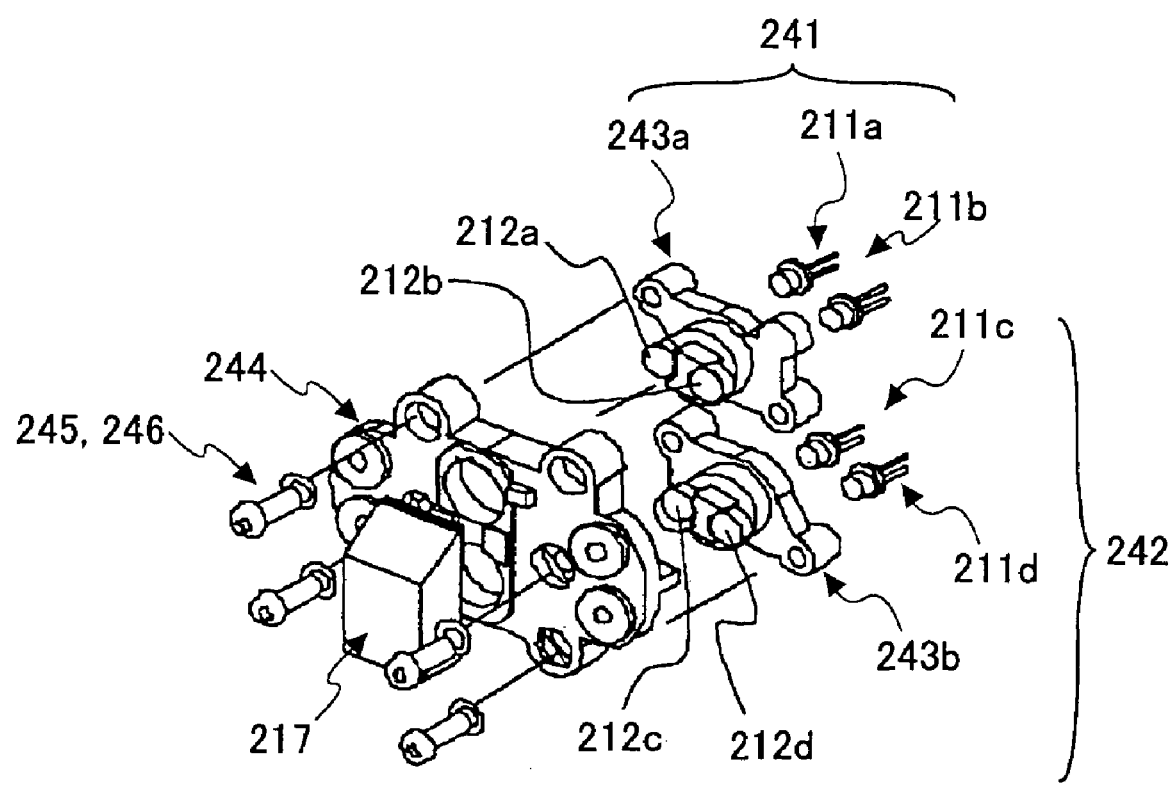
FIG. 13 is an exploded perspective view showing a conventional light source apparatus that emits four light beams.

FIG. 13 is an exploded perspective view showing a light source apparatus that emits four light beams. The light source apparatus includes the following: a first light source unit 241 and a second light source unit 242 constructed in the same manner as the light source unit 18 shown in FIG. 10; a beam mixing prism 217 that mixes two pairs of light beams emitted by the light source unit 241 and 242; and a holding member (flange) 244 that holds the light source units 241, 242, and the beam mixing prism 217 as one body. Since the light source apparatus is so constructed, the relative attitude of the first light source unit 241 and the second light source unit 242 changes in the sub scan sectional plane. As a result of the change in attitude, there is a risk that the relative positional relationship between the pair of light beams emitted by the light source unit 241 and the pair of light beams emitted by the light source unit 242 changes extremely over time or due to environmental change such as temperature.

Figure 14A:
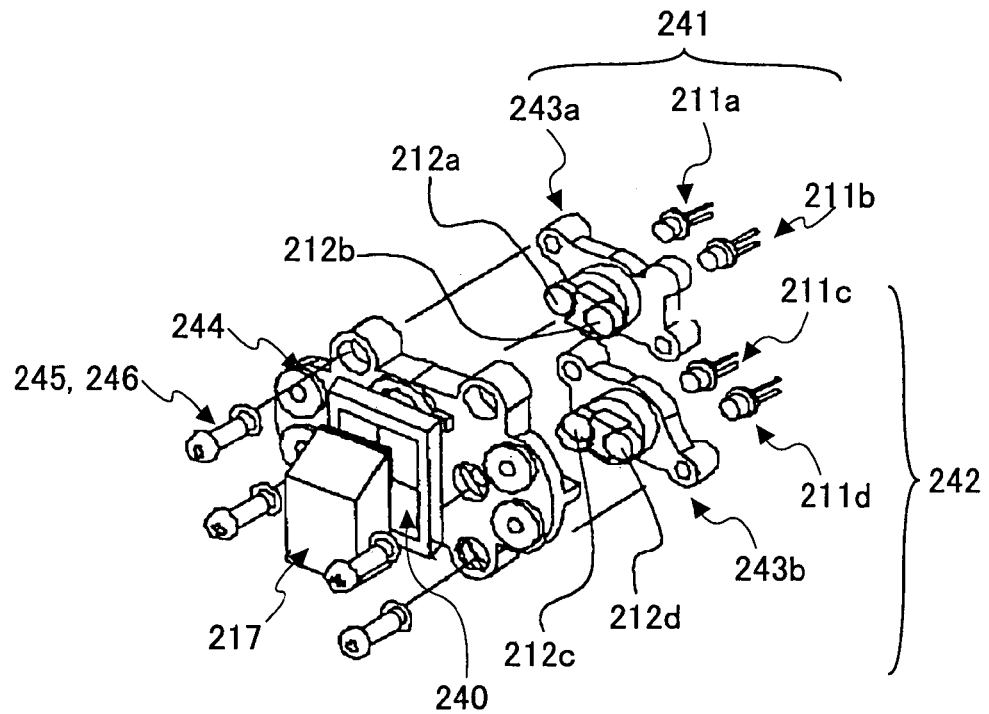
FIG. 14A is an exploded perspective view showing a light source apparatus that is constructed by adding a liquid crystal element to the light source apparatus shown in FIG. 13.
Figure 14B:
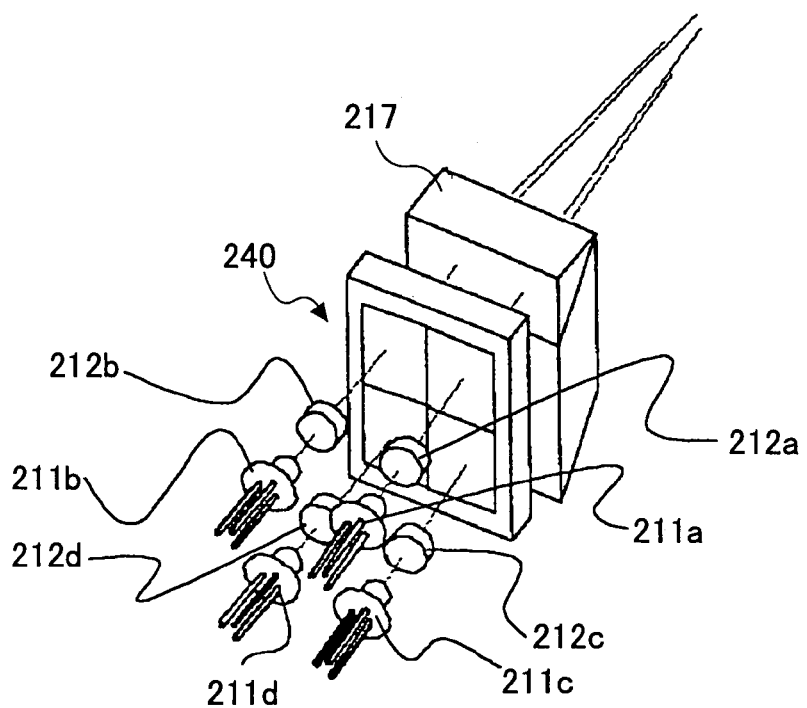
FIG. 14B is a perspective view showing major optical elements of the light source apparatus shown in FIG. 14A.

To avoid the above problem, as shown in FIG. 14A, a liquid crystal element 240 may be added to the light source apparatus shown in FIG. 13. Only major optical elements of the light source apparatus of FIG. 14A are shown in FIG. 14B.

Figure 15A:
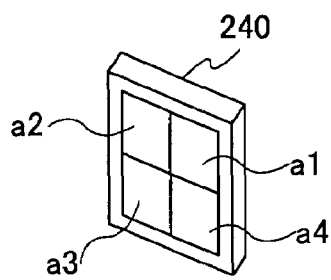
FIGS. 15A–15F are perspective views showing various examples of the liquid crystal elements to be added to the light source apparatus shown in FIG. 14A.
Figure 15B:
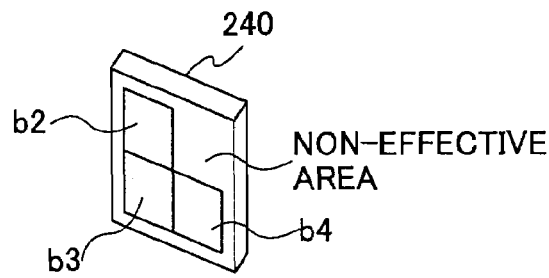
Figure 15C:
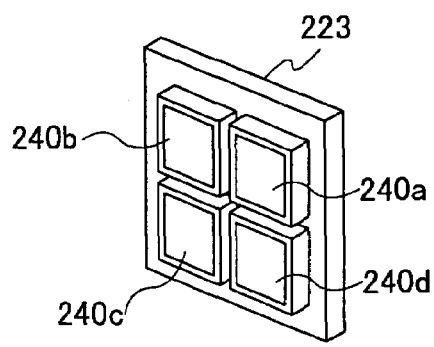

FIGS. 15A–15F are schematic diagrams for explaining six examples of liquid crystal element 240 shown in FIG. 14A. FIGS. 15A and 15C shows examples in which a liquid crystal element, or an effective area, is provided to each of four light beams. The remaining examples show examples in which a liquid crystal element, or an effective area, is provided to each of at least three light beams. All examples are the case where the number of light beams is four (N=4). The effective area is a divisional fraction of the light transmitting unit of a liquid crystal element. Each effective area is independently driven.

The examples shown in FIGS. 15A–15F are constructed as follows.

FIG. 15A shows the case that one liquid crystal element 240 having four effective areas a1–a4 corresponding to four light beams is provided.

FIG. 15B shows the case that one liquid crystal element 240 having three effective areas b2–b4 corresponding to three light beams is provided. The remaining light beam is the reference beam.

FIG. 15C shows the case that four liquid crystal elements 240a–240d corresponding to four light beams, fixed to a common holding member 223 are provided.

Figure 15D:
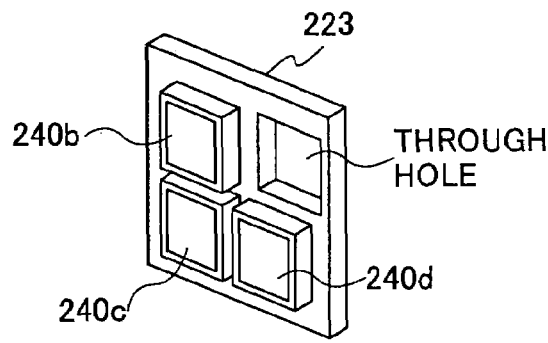

FIG. 15D shows the case that thee liquid crystal elements 240b–240d corresponding to three light beams, fixed to a common holding member 223 are provided. The remaining light beam is the reference beam.

Figure 15E:
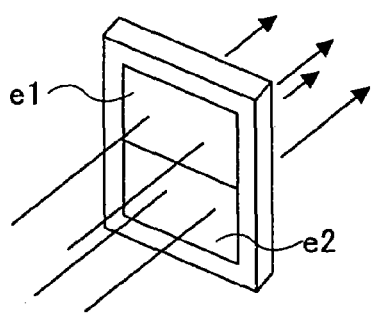

FIG. 15E shows the case that two liquid crystal elements e1 and e2, or a liquid crystal element having two effective areas e1 and e2 corresponding to two beams emitted by the first light source unit 241 are provided: No liquid crystal element is provided for the two beams emitted from the second light source unit 242.

Figure 15F:
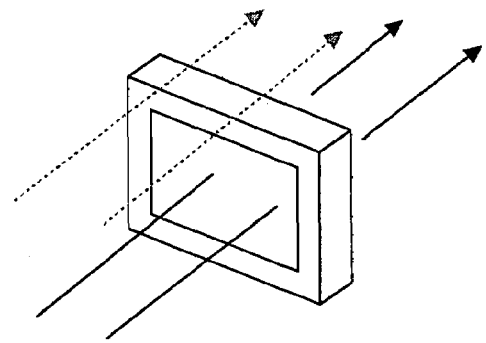

FIG. 15F shows the case that one liquid crystal element is provided so that the two beams emitted by the first light source unit 241 are deflected at the same deflecting angle. No liquid crystal element is provided for the two beams emitted by the second light source unit 242.

The positional change of the light beams described above can be compensated using the liquid crystal element(s) as shown in FIGS. 15A–15F.

The maximum value of a deflecting angle of a liquid crystal element that is required by the multi-beam scanning apparatus using a four beam light source apparatus is shown in FIG. 14A.

In the case of the four beam light source apparatus shown in FIG. 14A, for example, the relative deviation in the optical axes of the two beams emitted from the first light source unit 241 and the two beams emitted from the second light source unit 242 changes over time or due to environmental change such as temperature. The relative deviation of optical axes between the two pairs of beams is referred to as "relative optical axis deviation". The base members 243a and 243b, and the flange 244 are made of metallic material such as iron, aluminum, and zinc, or resin material that is easy to form. According to empirical knowledge, in the case that the above components are made of such materials, the maximum value of the relative optical axis deviation becomes up to +/−2.0 [minutes].

As described above with reference to FIG. 10, the coupling lenses 212a and 212b are fixed to the holding member via the adhesive layer of tens-hundreds of μm thick. The thickness of the adhesive layer may change due to thermal expansion, for example, and the change in the thickness may cause the relative deviation of the optical axes of the light beams.

Accordingly, the liquid crystal element is desired to have a maximum deviating angle large enough to compensate for this relative deviation in optical axes.

On the other hand, as described in the related art, the thickness of the liquid crystal layer needs to be increased so as to increase the maximum deflecting angle of the liquid crystal element. If the liquid crystal layer of tens or more μm thick is desired, special spacer members of high grade and high cost with small variance of diameters would be required. Increasing the thickness of the liquid crystal layer may cause the following side effects due to the deviation in thickness of the liquid crystal layer, the transparent electrode (ITO) film, and the orientation film:
 (a) linear degrading of refractive index distribution;
 (b) change in transmissivity due to multiple interference; and
 (c) degrading of wave-front aberration.

Accordingly, taking the cost, performance, and yields into consideration, the inventor considers it practical to set the maximum deflecting angle at about +/−4.0 [minutes].

In the cases shown in FIGS. 15B, 15D, and 15F in which a liquid crystal element is provided in the light paths of at least "N-1" light beams, the relative deviation in the optical axes of +/−2.0 [minute] needs to be compensated. Additionally, taking the adjustment in an assembly process in the factory, the inventor considers that the maximum deflecting angle of the liquid crystal element need to be +/−2.5 [minutes], or preferably, +/−4.0 [minutes].

On the other hand, in the case that the liquid crystal element is provided in the light paths of the "N" light beams as shown in FIG. 15E, the relative deviation of +/−2.0 [minutes] in the optical axes between the light beams emitted from the first light source unit and the second light source unit is compensable with the two effective areas e1 and e2. Accordingly, the maximum deflecting angle may be about a half the maximum deflecting angle in the cases of FIGS. 15B, 15D, and 15F. If the room for adjustment in the assembly process is added, the maximum deflecting angle of the liquid crystal element needs to be +/−1.5 [minutes], preferably +/−2.0 [minutes]. Needless to say, in the cases of FIGS. 15A and 15C, the maximum deflecting angle may be lowered as in the case of FIG. 15E.

As described above, since the liquid crystal elements are provided in the light paths of the "N" light beams, the number of liquid crystal elements required for the light scanning apparatus may increase. However, because the requisite maximum deflecting angle can be reduced, the requisite optical performance may be achieved at an even lower cost.

The liquid crystal element according to the above embodiment can adjust the beam position on the scanned face in a desired range without degrading the optical performance even if the maximum deflecting angle is limited to +/−4.0 [minutes].

An image forming apparatus according to the present invention is described below.

The image forming apparatus includes a light scanning apparatus, a charging unit, a developing unit, a transferring unit, a fixing unit, a photosensitive body, and a cleaning unit. The light scanning apparatus light scans the photosensitive body, and forms an electrostatic latent image on the photosensitive body by electrophotography. The image forming apparatus and its principle are well known. The photosensitive body is uniformly charged by the charging unit. As the light scanning apparatus forms an exposure distribution on the scanned face of the photosensitive body, potential is reduced depending on exposure distribution. The electrostatic latent image is formed on the scanned face. The developing unit attaches toner on the electrostatic latent image. The transferring unit transfers the toner attached to the photosensitive body to a sheet of paper, for example, and the fixing unit fixes the toner on the sheet of paper by fusion adherence. The cleaning unit removes the toner remaining on the photosensitive body.

The light scanning apparatus according to an above embodiment of the present invention realizes an effect of the present invention, that is, images are improved by compensating the light beam (beam spot) position on the photosensitive body, depending on necessity. In the case of the multi-beam scanning apparatus that uses a plurality of beams for scanning, printing speed and printing density can be improved.

The beam spot pitch mainly in the sub scan directions, that is, the scan line pitch, is given a fine adjustment in the assembly process in the factory, but the scan line pitch may change due to vibration and shock during transportation and installation of the image forming apparatus. The scan line pitch may also change due to change over time and/or environmental change such as temperature.

To solve this problem, a detecting system that detects the scan line pitch may be provided to the image forming apparatus. The scan line pitch can be compensated by controlling the liquid crystal element based on the result of detection.

The liquid crystal element can change pixel density in the sub scan directions. In the case that the image forming apparatus according to the present invention is embodied in a multifunctional apparatus that functions as a printer and a copier, for example, the multifunctional apparatus can switch pixel density in the printer mode in which the multifunctional apparatus functions as a printer and pixel density in the copier mode in which the multifunctional apparatus functions as a copier. For example, the multifunctional apparatus can switch the pixel density between 600 dpi in the printer mode and 400 dpi in the copier mode. The image forming apparatus can realize the pixel density fitting each mode.

An operator can switch the pixel density of the image forming apparatus by operating an operational panel, for example, provided thereto. For example, the operator may desire to switch between a high image quality mode (1200 dpi) and a high speed printing mode (600 dpi). The image forming apparatus according to the present invention can easily change the pixel density by driving and controlling the light path deflecting element provided therein.

According to the present invention, the light scanning apparatus can adjust the beam position on the scanned face without degrading optical performance thereof.

Figure 16:
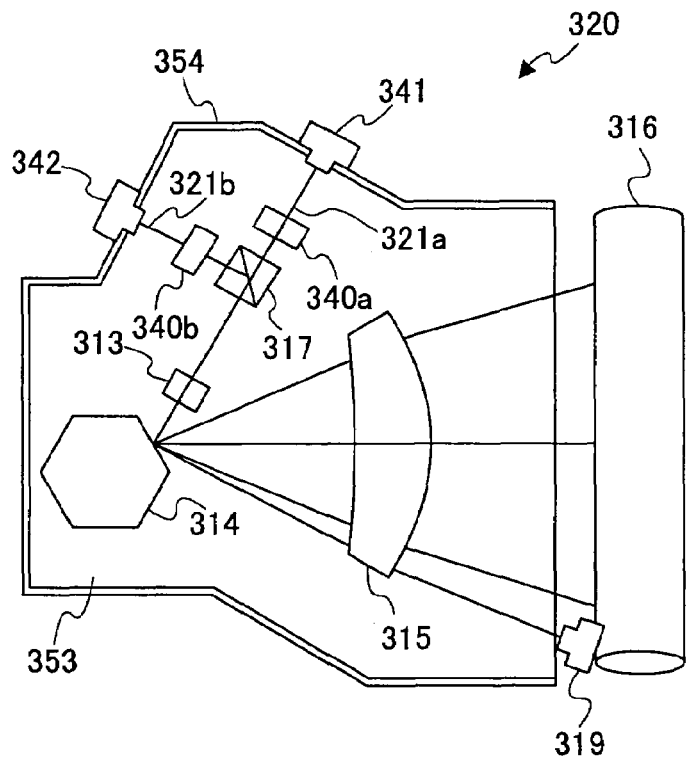
FIG. 16 is a schematic diagram showing a light scanning apparatus according to an embodiment of the present invention of which optical elements are expanded on a plane parallel to the deflecting reflective face.

FIG. 16 is a schematic diagram showing a light scanning apparatus according to an embodiment of the present invention, spread in a plane parallel to the deflecting rotative plane. A reference numeral 341 refers to a first light source unit; a reference numeral 342 refers to a second light source unit; a reference numeral 317 refers to a beam mixing prism; reference numerals 340a and 340b refer to liquid crystal elements that control the positions of light beams on the scanned face by deflecting the light paths of the light beams from the light sources 341 and 342, respectively; a reference numeral 313 refers to a cylindrical lens; a reference numeral 314 refers to a polygon mirror that is a deflector; a reference numeral 315 refers to a scanning optical system; a reference numeral 316 refers to a photosensitive drum; a reference numeral 319 refers to a light beam intensity detecting unit; a reference numeral 353 refers to an optical housing; and a reference numeral 354 refers to the side wall of the housing. The polygon mirror 314 is rotated at a constant rotative speed by a driving mechanism (not shown) including a motor.

A two-beam scanning apparatus that scans two light beams simultaneously is illustrated as an example of a light scanning apparatus used for a color image forming apparatus. The light scanning apparatus according to the present invention is also applicable to a multi-beam scanning apparatus that scans more than two light beams.

Two light beams 321a and 321b emitted by the first light source unit 341 and the second light source unit 342, respectively, are mixed by the beam mixing prism 317, then converge and form a long linear image in the main-scan directions on the deflecting reflective face of the polygon mirror 314 through the cylindrical lens 313. The light beams forms beam spots on the surface of the photosensitive body drum 316 by the scanning optical system (scanning lens) 315 and scan the surface. The main-scan directions are directions in which the beam spots scan the surface of the photosensitive body drum 316. The sub-scan directions are directions perpendicular to the main-scan directions. In the following description, the directions corresponding to the main-scan directions and the sub-scan directions at a position in the light paths are called in a broad sense, "the main-scan directions" and "the sub-scan directions", respectively.

A light beam position compensating unit is often provided to the above light scanning apparatus (multi-beam scanning apparatus) so as to initially adjust the light beam position (light beam pitch) and to compensate environmental and change over time.

Figure 17:
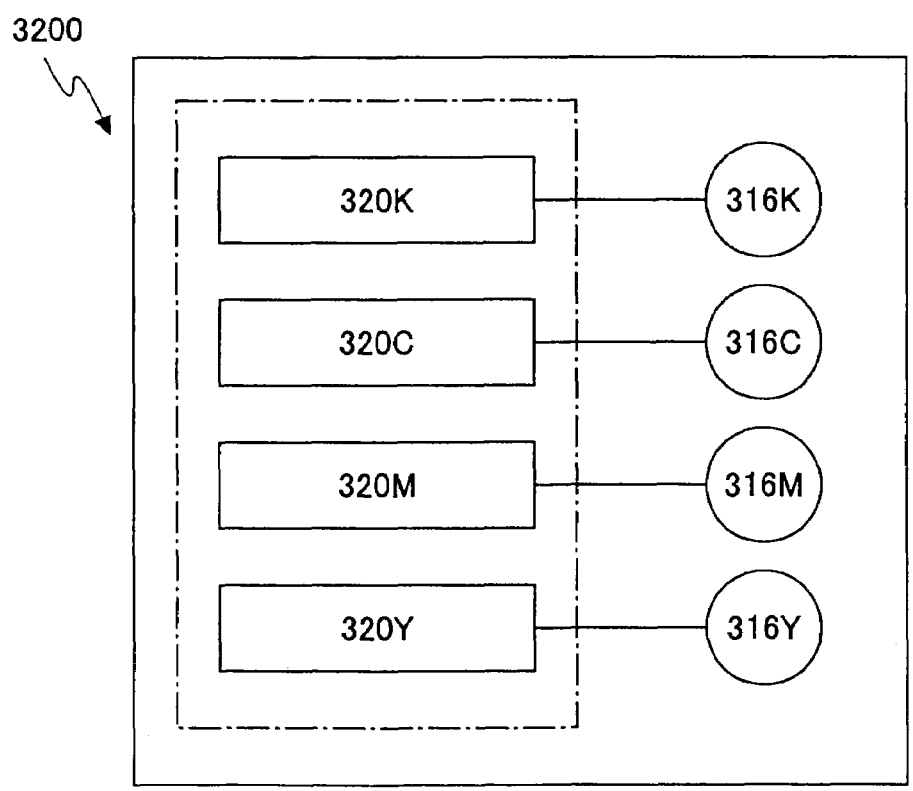
FIG. 17 is a schematic diagram showing an image forming apparatus according to an embodiment.

FIG. 17 is an optical layout showing an image forming apparatus according to an embodiment. The image forming apparatus 3200 is a color image forming apparatus that outputs color images. The image forming apparatus 3200 is a so-called tandem type image forming apparatus in which four light scanning apparatus 320K, 320C, 320M, and 320Y identical to the light scanning apparatus 320 shown in FIG. 16 are used as light writing apparatuses. The light beam position compensating unit is often provided to the tandem type image forming apparatus so as to adjust the light beam positions between the light writing apparatuses (stations). The image forming apparatus 3200 is described in detail below.

Light beam position compensating unit are conventionally constructed in the following manner, in which the light beam is deflectable:

(1) rotating the reflecting mirror,
(2) shifting or rotating the cylindrical lens,
(3) shifting or rotating the prism,
(4) providing an electro-optical element or an AOM, and
(5) rotating a parallel plate provided between the semiconductor laser and the coupling lens.

The above conventional methods cause problems such that the size, power consumption, heat production, and noise of the system become too large. To solve these problems, a liquid crystal element of which size, weight, and power consumption are small and that produces no noise is employed as the light beam position compensating unit.

The transmissivity of the liquid crystal element depends on the compensation amount of the light beam position, that is, beam deflecting angle. The change in the transmissivity of the liquid crystal element may cause a change in light intensity at the surface of the photosensitive drum 316, and the change in the light intensity may degrade images formed by the image forming apparatus. Accordingly, according to the present invention, the change in transmissivity of the liquid crystal due to the change in the beam deflecting angle is specified to be 4% or less, more preferably 2% or less so as to make the change in the light beam intensity at the scanned face small and consequently, to prevent the quality of images from degrading.

The change in the light beam intensity at the scanned face means the change in the light beam intensity at the same image height. The change does not include "shading properties" depending on the image height, that is, the change in the reflective index of the polygon mirror due to the rotation thereof, the change in transmissivity and reflective index of the scanning lens and the reflecting mirror, for example, depending on the image height.

Where the focal distance of the coupling lens fcol=15 (mm), and the sub-scan convergence magnification of the entire multi-beam scanning apparatus mZ=9.5 (times), and the light path deflecting angle of the liquid crystal element θ=2.0 (minutes)=0.66 (mrad), the change in the light beam position at the scanned face is:

$$Z = mZ * fcol * \tan\theta$$
$$= 9.5 * 15 * \tan(0.66 \times 10^{-3})$$
$$= 0.095 (mm) = 95 (\mu m).$$

In the case of an optical system having the above optical properties, for example, the change in the light beam position at the scanned face due to change over time, environmental change, and installation is empirically known to be about 10 μm. The light path deflecting angle required for compensating the change in the light beam position is at most θ=2.0 min.

The change in transmissivity of the liquid crystal element within the above light path deflecting angle is an extremely important parameter to maintain both the light beam position and the light beam intensity at high accuracy. The change in light beam intensity caused by the light beam position adjustment within the required range is controllable provided that T/θ is equal to or less than 4 (%)/2.0 (min)=2.0 (%/min), where the change in transmissivity of the liquid crystal is T (%), and the light path deflecting angle is θ (minute).

Figure 18A:
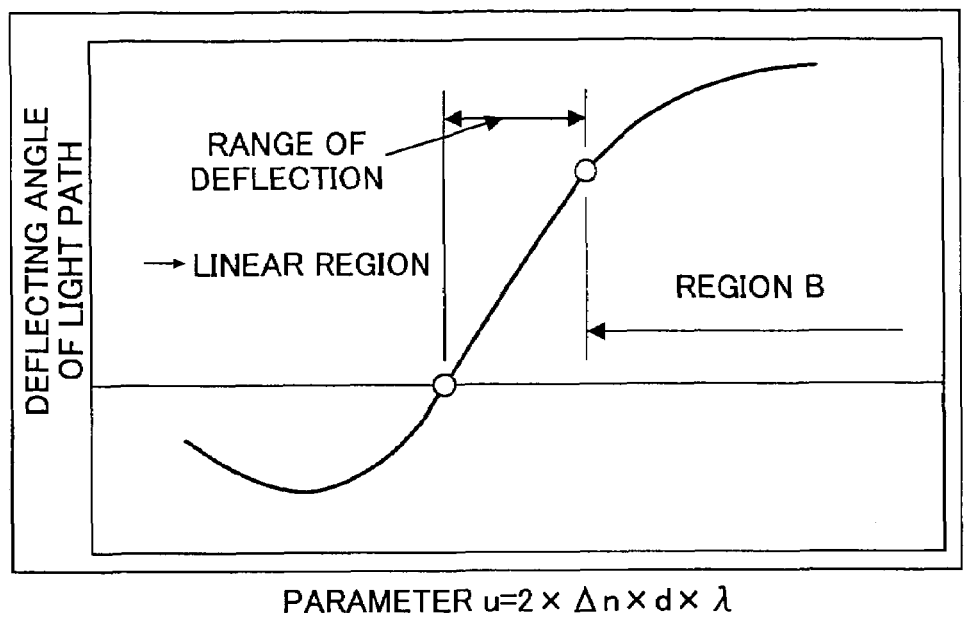
FIGS. 18A and 18B are graphs illustrating the change in transmissivity of a liquid crystal element accompanying beam deflection.
Figure 18B:
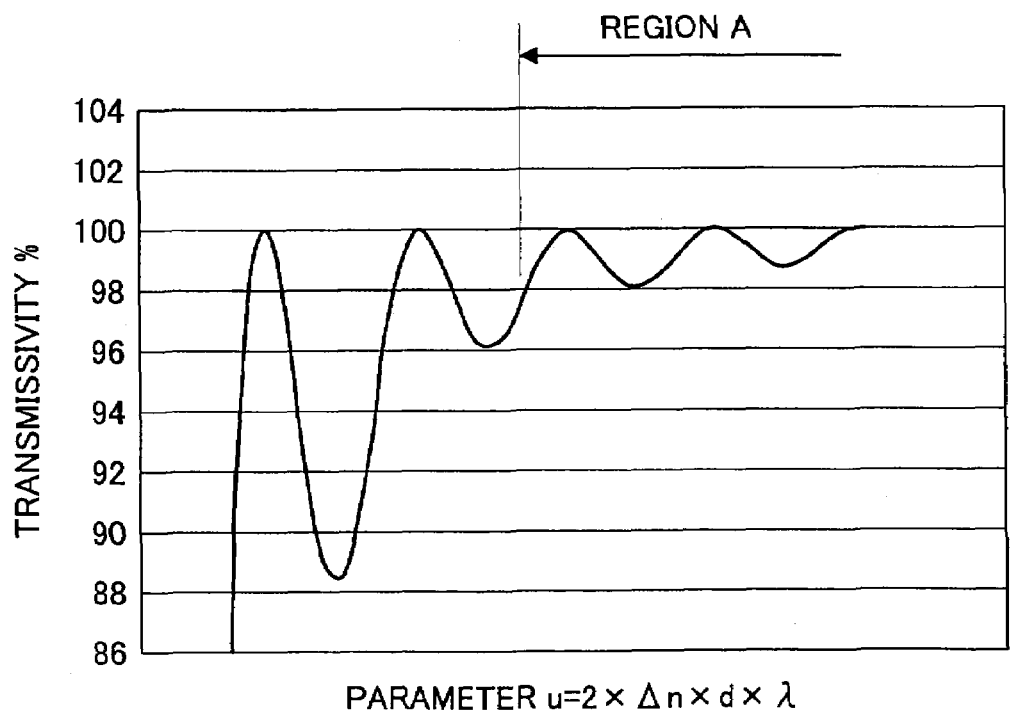

The reasons why the transmissivity of the liquid crystal element changes, and consequently the light beam intensity on the scanned face changes are as follows:

(1) The nematic type liquid crystal element forms the gradient of refractive index in the liquid crystal layer and consequently deflects the light beam by changing the anisotropy in refractive indexes of regular ray and irregular ray Δn (ne−no) with driving voltage applied to the liquid crystal. As shown in FIG. 18B, the transmissivity cyclically changes as a function of the beam deflecting angle, that is, the anisotropy in refractive index. The anisotropy Δn can be changed generally by applying a voltage to the liquid crystal layer sandwiched by a pair of glass substrates, transparent electrodes, and orientation films, for example, through the transparent electrodes. The gradient of refractive index proportional to the applied voltage is formed in the liquid crystal layer.

(2) A liquid crystal element can deflect the light beam by diffracting the light beam with a diffractive lattice based on the pattern of electrodes. The transmissivity changes since the diffractive efficiency of the diffractive lattice depends on the pitch of the diffractive lattice.

FIGS. 3A and 3B are graph of the light path deflecting angle and the transmissivity, respectively, as functions of a parameter $u=2*\Delta n*d*\lambda$, where $\Delta n$ (=ne−no) is the anisotropy in refractive index of the liquid crystal, "d" is the thickness of the liquid crystal layer, and "λ" is the wavelength of the light beam. The parameter "u" corresponds to the deflecting angle φ of the light beam by the liquid crystal element.

As described above, in the case of the optical system satisfying the previous conditions, that is, fcol=15 (mm), and mZ=9.5, the range in which the transmissivity η changes is desired to be 4%, more preferably 2%. Accordingly, the liquid crystal needs to be used in the region "A" shown in FIG. 18B in which the transmissivity is between 98% and 100% (width being 2%). However, as shown in FIG. 18A, the wavefront aberration (spherical aberration) becomes too large and the optical properties are degraded in a region "B". The liquid crystal deflecting element is not usable in the region "B".

The transmissivity η of the liquid crystal is obtainable using the following equation:

$$\eta = 1 - [\sin^2\{(\pi/2) \times (1+u^2)^{1/2}\}]/(1+u^2).$$

If the light beam position is desired to be moved by Δz in the sub-scan directions on the scanned face, the light beam needs to be deflected by φZ (the sub-scan directions component of the beam deflecting angle) so that φZ satisfies $$\Delta z = fcol \times mZ \times \tan \phi Z, \text{ or}$$

$$\phi Z = \tan^{-1}(\Delta z/fcol \times mZ),$$

where fcol is the focal distance of the coupling lens, mZ is the sub-scan magnification of the entire system, and φZ is the sub-scan directions component of the beam deflecting angle.

If the light beam position is desired to be moved by Δy in the main-scan directions on the scanned face, the light beam needs to be deflected by φY so that φY satisfies $$\phi Y = \tan^{-1}(\Delta y/fcol \times mY) = \tan^{-1}(\Delta y/FY),$$

where mY is the main-scan magnification of the entire system, and φY is the main-scan directions component of the beam deflecting angle.

Figure 19:
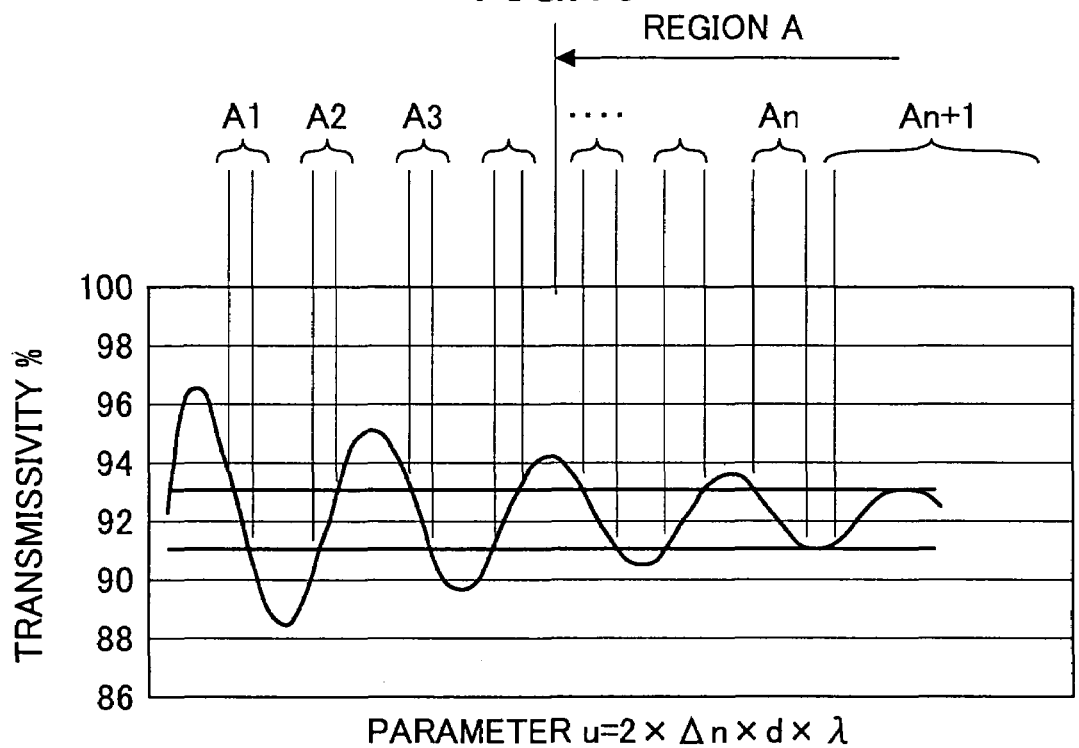
FIG. 19 is another graph illustrating the change in transmissivity of a liquid crystal element accompanying beam deflection.

FIG. 19 is another graph of the transmissivity of the liquid crystal element as a function of the parameter $u = 2 \ast \Delta n \ast d \ast \lambda$. If the transmissivity of the liquid crystal element changes as shown in FIG. 19, the liquid crystal element needs to be used in regions A1–An in which the transmissivity changes in a range between 91% and 93% (width being 2%). Since the regions A1–An are separate from each other, the usable light path deflecting angles are discrete. In this case, one may shorten the cycle by setting design parameters appropriately so as to obtain the desired deflecting angle at a high resolution. However, because the wavefront aberration of the liquid crystal becomes large as the parameter "u" increases, the liquid crystal element cannot be used in the regions on the right side of the region $A_{n+1}$ for example.

In the case of the light scanning apparatus according to the present invention, 10 or more cycles of the cyclic change in transmissivity may exist in the range of the light path deflection, that is, the range of the light beam position adjustment. For example, in the case of the above optical system where fcol=15 (mm) and mZ=9.5, if the light beam position on the scanned face is desired to be moved by 95 (μm), and the cycle of the cyclic change in transmissivity is set at 10 or more, the light beam position becomes adjustable at a resolution of at least 9.5 (μm).

If the maximum value of the transmissivity in each cycle is substantially equal, the transmissivity can be maintained at high side, and energy loss can be reduced.

Figure 20:
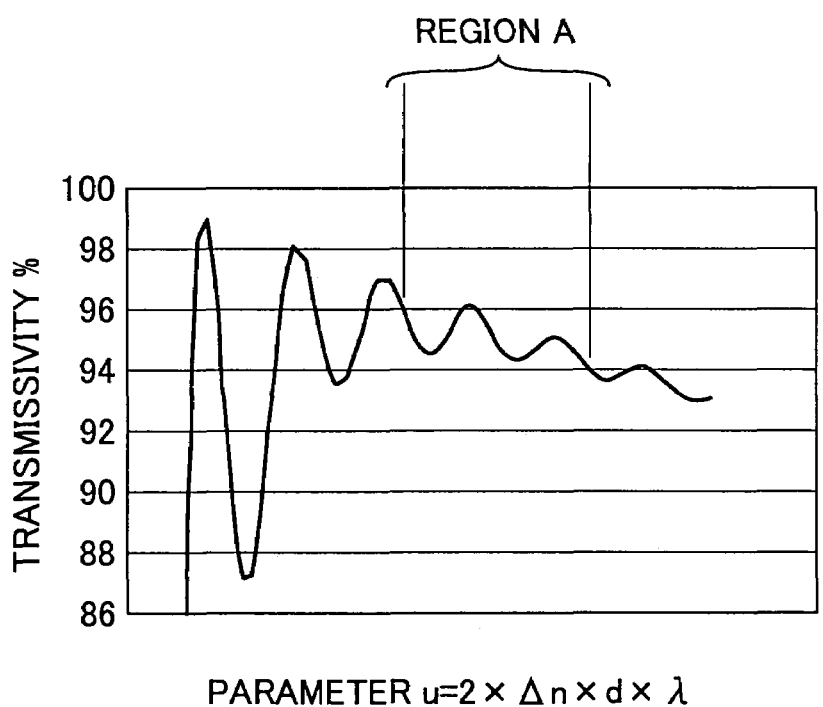
FIG. 20 is yet another graph illustrating the change in transmissivity of a liquid crystal element accompanying beam deflection.

Additionally, in the case that the transmissivity decreases while oscillating as the anisotropy Δn increases as shown in FIG. 20, the liquid crystal is usable in a region in which the beam deflecting angle falls into the desired range and the transmissivity change is 4% (more preferably 2%). In the case of FIG. 20, the liquid crystal element is used in the region "A" where the transmissivity is between 94% and 96% (width being 2%).

As shown in FIG. 18A, in general, the light path deflecting angle linearly increases as the voltage applied to the liquid crystal layer increases, that is, Δn increases. The linearity, however, is lost as the applied voltage further increases and exceeds a certain value. The wavefront aberration becomes too large too. Such a region of the applied voltage, that is, the parameter "u", is shown in FIG. 18A as the region "B".

The liquid crystal element is difficult to use in a nonlinear region on the left side of the linear region shown in FIG. 18A. The preferably designed liquid crystal elements exhibit a wide region in which their transmissivity is 2% or less and, at the same time, the light path deflecting angle changes linearly.

As described above, the deviation in the light beam at the scanned face, that is, at the same image height and/or the deviation between a plurality of beams is reduced by the reduction of the transmissivity change in the desired range (light beam position adjusting range) of the light path deflection angle of the liquid crystal element. Accordingly, even when switching the light beam from one color to another, the light scanning apparatus according to the present invention can avoid imbalance among the colors and consequently avoid the degrading of color image quality.

In addition, a light beam intensity detecting unit may be provided to the light scanning apparatus according to the present invention. The light beam intensity detecting unit detects the light beam intensity at the scanned face or a plane equivalent thereto. When the light beam intensity exceeds a predetermined value, the liquid crystal element may be driven to deflect the light path so that the light beam intensity falls in a predetermined range.

In the case that the liquid crystal element exhibits the transmissivity as shown in FIG. 19, the adjustment of the light beam position may be discrete. This problem can be solved by appropriately designing the cycle of the transmissivity oscillation based on the desired resolution of the light beam position adjustment.

The light beam intensity or the deviation in intensity between a plurality of light beams may be further improved (1% or less, for example) by the light beam intensity compensating unit that compensates the light beam intensity on the scanned face.

As shown in FIG. 18A, the relationship between the light path deflecting angle of the liquid crystal element and the change in the light beam intensity at the scanned face is theoretically determinable (by design). If a table with which the light intensity compensating amount can be obtained based on the beam deflecting amount is prepared, and the light beam intensity compensating unit is driven/controlled based on such a table, the light scanning apparatus can compensate the light beam intensity without the light beam intensity detecting unit.

The emission intensity of the light source (semiconductor laser) may be controlled in order to compensate the light beam intensity. Alternatively, a filter such that controls the light beam intensity using the polarization characteristics of the light beam, absorbs light energy inside, or reflects the light energy at the surface thereof may be provided in the light path of the light beam.

The actual intensity of the light beam may vary due to dispersion of parts and assembly, change over time, and environmental change such as temperature and humidity. Accordingly, it is recommended that, as shown in FIG. 16, a light beam intensity detecting unit 319 be provided on the scanned face (or at an optically equivalent position) so that the light beam intensity compensating unit is controlled based on the light beam intensity detected by the light beam intensity detecting unit 19.

An image forming apparatus according to the present invention is described below.

FIG. 17 is a optical layout showing an image forming apparatus according to the embodiment. The image forming apparatus 3200 includes the following: the light scanning apparatuses 320K, 320C, 320M, and 320Y corresponding to black (K), cyan (C), magenta (M), and yellow (Y), respectively; the photosensitive drums 316K, 316C, 316M, and 316Y; the developing unit that manifests electrostatic latent images with toner formed on the surface of the photosensitive drums; the transferring unit that transfers the manifest toner images; and other units for processing the electrophotography process. The image forming apparatus 3200 is a tandem type image forming apparatus that advantageously forms high density color images at a high speed by scanning a plurality of light beams simultaneously. The surface of each photosensitive body drum corresponds to the scanned face. Compared with a color image forming apparatus having one exposing unit that needs to form an image corresponding to a different color four times, the color image forming apparatus having four exposing units can output images four times in volume. The developing unit and the transferring unit, for example, are not shown in the drawing.

Although not shown in FIG. 17, a processing unit for electrophotography such as a charging unit, a developing unit, and a transferring unit, are provided around each photosensitive drum. The light scanning apparatus performs the exposure process of electrophotography, and specifically, forms electrostatic latent images by scanning the surface of the photosensitive drum uniformly charged by the charging unit.

In the multi-color mode of the tandem type image forming apparatus having a plurality of photosensitive bodies, electrostatic latent images are formed on the photosensitive body drums 316K, 316C, 316M, and 316Y by exposing units in response to an image signal of corresponding color.

The electrostatic latent images are developed with a toner of corresponding color into toner images, and sequentially transferred to and superposed on a sheet of transfer paper electrostatically absorbed and carried by a transfer belt. The superposed images are fixed and discharged by the fixing unit as a full color image. The transferring belt, the transfer paper, and the fixing unit are not shown in the drawing.

In a single color mode, however, only the photosensitive body drum and the processing units corresponding to a color (either K, C, M, or Y) operate, and the photosensitive body drums and the processing units corresponding to the other colors do not operate.

In the case that a light beam is emitted from each light scanning apparatus 320K, 320C, 320M, and 320Y, the image forming apparatus can form full-color (four color) images. In the case that at least one of the four light scanning apparatuses is the light scanning apparatus with a plurality of light beams (N), and the light scanning is performed by only this light scanning apparatus, an image "N" times as high in density as the full color image is available.

If the carrying speed of recording medium and processing speed is set to four times, the number of output pages becomes four times. Additionally, even in the full color image mode, characters are often written in black at a high density. While the above multi-beam (N) light scanning apparatus 320K (black) operates, the other (single beam) light scanning apparatuses 320C, 320M, and 320Y are operated. Accordingly, the image forming apparatus can output high-quality image with characters, photographs, and drawings mixed.

The light scanning apparatus according to an embodiment of the present invention provided in the image forming apparatus 3200 can adjust the relative position (beam pitch) of the plurality of beams scanning the surface of the photosensitive body drum (scanned face) to a desired value. Accordingly, the image forming apparatus 3200 can form high quality images.

Figure 21:
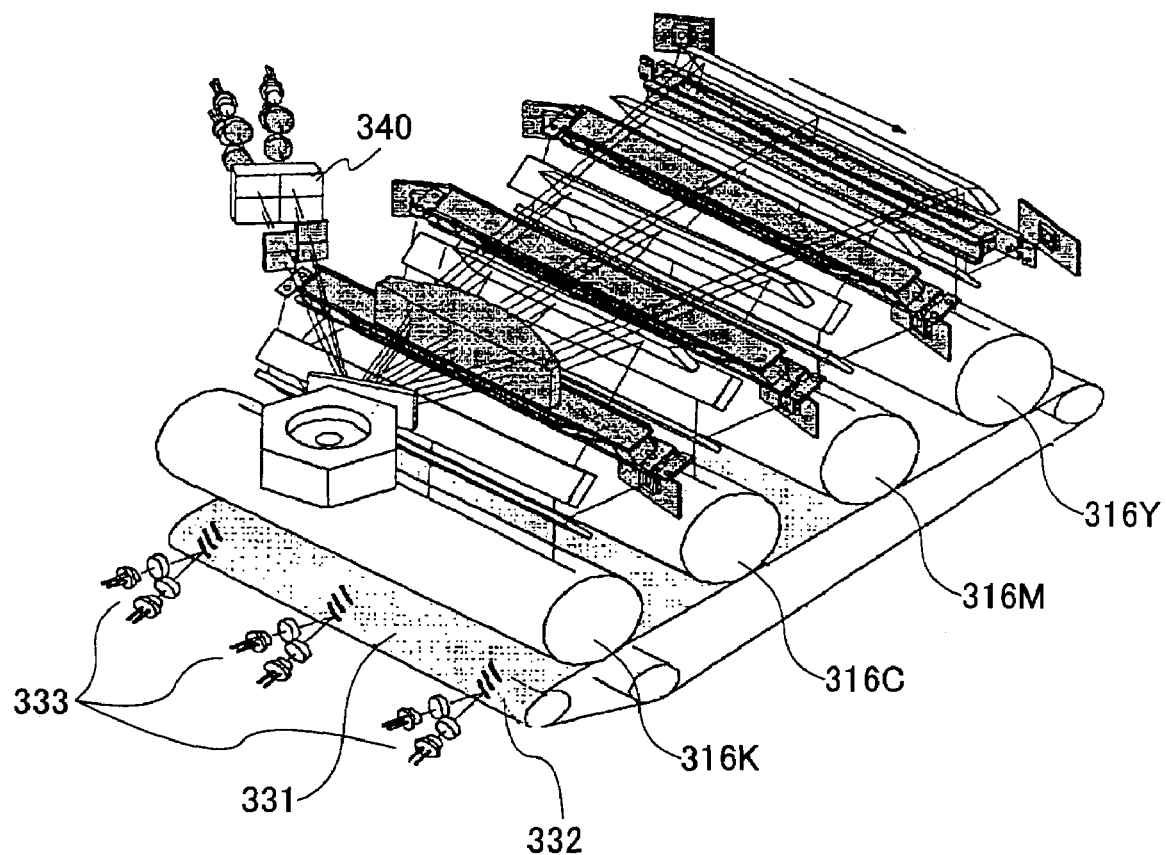
FIG. 21 is a schematic diagram showing an image forming apparatus according to another embodiment of the present invention.

FIG. 21 is a schematic diagram showing an image forming apparatus according to another embodiment of the present invention. The image forming apparatus shown in FIG. 21 is a tandem type image forming apparatus in which a plurality of light beams emitted by a plurality of light sources scan a plurality of scanned faces simultaneously. A polygon mirror and a scanning optical system as a deflecting unit are not described since they are identical to those known in public. A liquid crystal element 340 is provided in each light path to the photosensitive body drum 316K, 316C, 316M, and 316Y, the liquid crystal element 340 adjusting the light beam position on each photosensitive body drum. The liquid crystal element 340 may be a single element including a plurality of effective areas therein, or may be made of a plurality of independent elements corresponding to the light beams each having a single effective area.

The light scanning apparatus according to an embodiment of the present invention provided in the image forming apparatus can compensate the relative position of the light beams scanning different photosensitive body drums with the liquid crystal element 340. For example, a toner image 332 formed on a transfer belt 331 is detected by a color mismatch detecting sensor 333, and the liquid crystal element 340 is driven based on the result of the detection, that is, the color mismatch between stations; the image forming apparatus can compensate the difference in timing at which each station starts writing. Accordingly, the color mismatch of the toner image 332 on the transferring belt 331 is reduced, which results in high quality images.

If an image forming apparatus such as a copier or a printer continuously outputs tens or more of sheets of transfer paper, a color mismatch between stations may occur due to the increase in temperature in the image forming apparatus. When a liquid crystal element is used to compensate the color mismatch, the transmissivity may change depending on the compensation amount, and as a result, the light beam intensity on the photosensitivity body drum may change. The light scanning apparatus according to the present invention, however, can reduce the change in the light beam intensity. Accordingly, the light scanning apparatus can prevent the quality of output images from degrading even when continuous image forming is required.

In addition, the light scanning apparatus can prevent the quality of output images from degrading due to shock and vibration during transportation and installation of the image forming apparatus and/or change over time.

It is not necessary to provide a liquid crystal element in all light paths of the light beams. If a color (black, for example) is used as a reference, the liquid crystal element may be provided in the light paths of the other colors (cyan, magenta, and yellow, for example) so as to adjust the light beam positions to the reference color.

Figure 22:
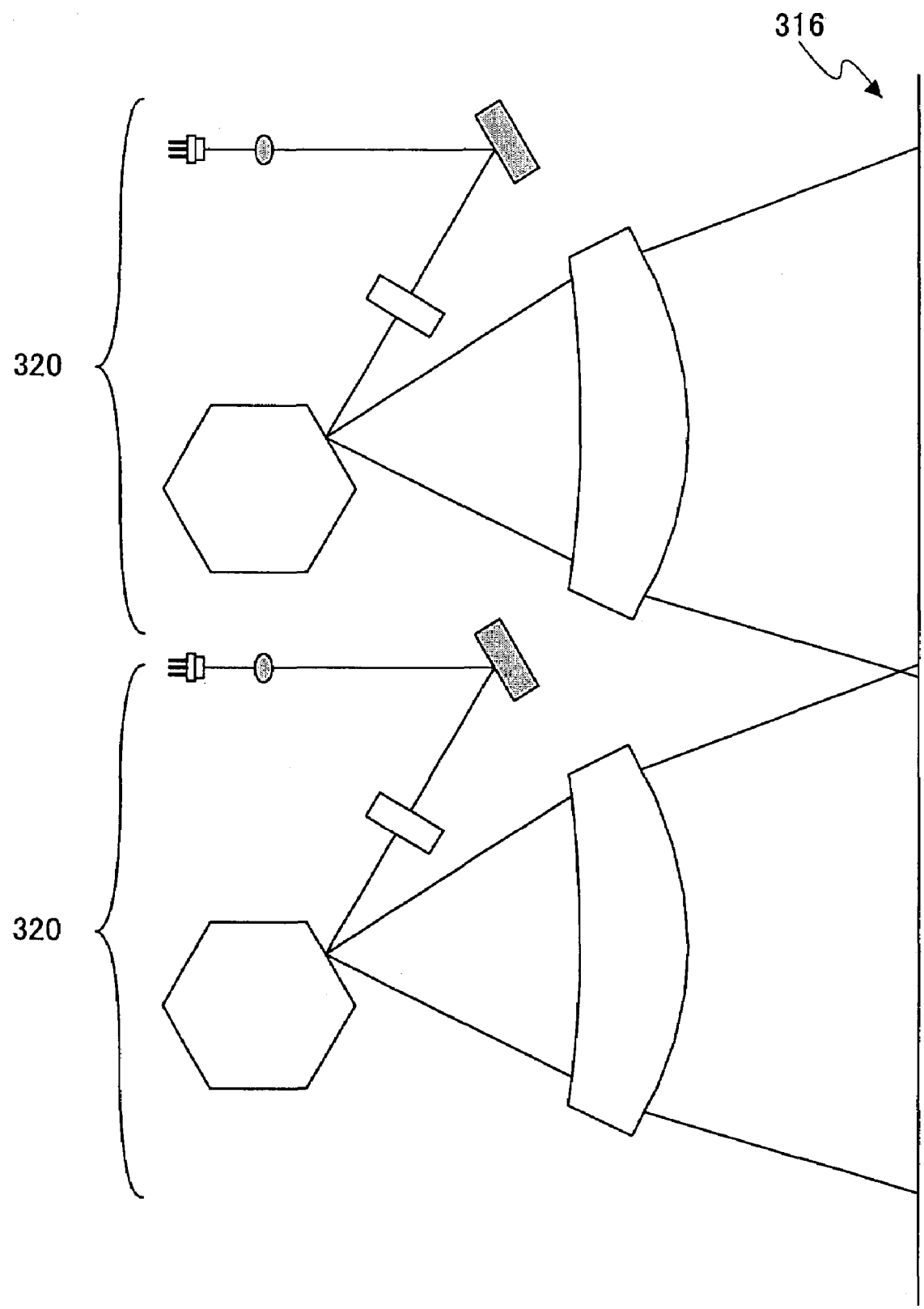
FIG. 22 is a schematic diagram showing an image forming apparatus according to yet another embodiment of the present invention.

FIG. 22 is a schematic diagram showing an image forming apparatus according to yet another embodiment of the present invention. FIG. 22 shows the layout of the optical components in a plane parallel to the deflecting rotation plane. This image forming apparatus includes a plurality of light scanning apparatuses 320 arrayed in the main scan directions. A scanned face 316 is divided into a plurality of regions by dividing the effective writing width thereof, and each light scanning apparatus 320 scans a corresponding region.

The light scanning apparatus according to the present invention, if applied to the image forming apparatus, can compensate the light beam position at the joint of the divided scan on the scanned face 316 at installation, for example. If the effective writing width can be increased, optical components and deflecting units, for example, constructing the light scanning apparatus can be downsized; the change in beam waist position due to mechanical tolerance and temperature change becomes small, and the wavefront aberration is reduced. Accordingly, the image forming apparatus can output high quality images.

According to the present invention, the transmissivity of the liquid crystal element that controls the light beam position on the scanned face within the deflecting range of the light path is suppressed, the deviation between a plurality of light beams on the scanned face, and the degrading in quality of output image can be sustained.

The preferred embodiments of the present invention are described above. The present invention is not limited to these embodiments, but various variations and modifications may be made without departing from the scope of the present invention.

This patent application is based on Japanese priority patent applications No. 2002-204164 filed on Jul. 12, 2002, No. 2002-379681 filed on Dec. 27, 2002, and No. 2002-379958 file on Dec. 27, 2002, the entire contents of which are hereby incorporated by reference.

What is claimed is:

1. A light scanning apparatus configured to scan a scanned face with a light beam, comprising:
   a liquid crystal element configured to deflect the light beam to adjust the position of a light spot of said light beam formed on the scanned face, said liquid crystal element being provided between a light source and a polygon mirror; and
   a compensating unit configured to compensate a light intensity of the light beam at the scanned face due to a change caused by an adjustment of a position of the light spot, wherein said light scanning apparatus scans said scanned face with a plurality of N light beams emitted by N light sources, and said liquid crystal element further comprises at least N-1 deflecting units located between said light source and said polygon mirror, wherein each of the deflecting units deflects a corresponding one of the plurality of light beams in sub-scan directions and adjusts scan line pitch.

2. The light scanning apparatus as claimed in claim 1, wherein said liquid crystal element further comprises a liquid crystal deflecting element.

3. The light scanning apparatus as claimed in claim 1, wherein said deflecting unit further comprises a semiconductor laser and a coupling lens combined with a holder rotatable around an axis parallel to the optical axis of said coupling lens, the emission source of said semiconductor laser being eccentric to said optical axis.

4. The light scanning apparatus as claimed in claim 3, wherein said deflecting unit further comprises an aperture combined with said holder configured to shape said light beam, said aperture being eccentric to the light path of said light beam emitted by said semiconductor laser and passing through the center of said coupling lens.

5. The light scanning apparatus as claimed in claim 1, further comprising a detecting unit configured to detect the intensity of said light beam.

6. The light scanning apparatus as claimed in claim 1, wherein said compensating unit is configured to control the radiation intensity of said light source.

7. The light scanning apparatus as claimed in claim 1, further comprising a resin lens provided in the optical path from said light source to said scanned face.

8. A light scanning apparatus configured to scan a scanned face with a light beam, comprising:
   a liquid crystal element configured to deflect the light beam to adjust the position of a light spot of said light beam formed on the scanned face, said liquid crystal element being provided between a light source and a polygon mirror; and
   a compensating unit configured to compensate a light intensity of the light beam at the scanned face due to a change caused by an adjustment of a position of the light spot, wherein said liquid crystal element further comprises a second liquid crystal deflecting element array having a plurality of liquid crystal deflecting elements arrayed in main-scan direction, each of which is configured to deflect said light beam in sub-scan direction, said second liquid crystal deflecting element array being provided between said polygon mirror and said scanned face.

9. A light scanning apparatus configured to scan a scanned face with a light beam, comprising:
   a liquid crystal element configured to deflect the light beam to adjust the position of a light spot of said light beam formed on the scanned face, said liquid crystal element being provided between a light source and a polygon mirror;
   a compensating unit configured to compensate a light intensity of the light beam at the scanned face due to a change caused by an adjustment of a position of the light spot; and
   a detecting unit configured to detect the intensity of said light beam, wherein said detecting unit is further configured to detect said light beam for synchronization of light scanning.

10. A light scanning apparatus configured to scan a scanned face with a light beam, comprising:
   a liquid crystal element configured to deflect the light beam to adjust the position of a light spot of said light beam formed on the scanned face, said liquid crystal element being provided between a light source and a polygon mirror;
   a compensating unit configured to compensate a light intensity of the light beam at the scanned face due to a change caused by an adjustment of a position of the light spot; and
   an aperture provided between said light source and said polygon mirror and configured to shape said light beam, wherein said compensating unit is configured to displace said aperture.

11. An image forming apparatus, comprising:
   a photosensitive medium; and
   a light scanning apparatus configured to scan a scanned face of said photosensitive medium with a light beam, said light scanning apparatus further comprising:
   a liquid crystal element configured to deflect the light beam to adjust the position of a light spot of said light beam formed on said photosensitive medium, said liquid crystal element being provided between a light source and a polygon mirror; and a compensating unit configured to compensate the light intensity of the light beam at the photosensitive medium due to a change caused by the adjustment of said position of the light spot, wherein said light scanning apparatus scans said scanned face with a plurality of N light beams emitted by N light sources, and said liquid crystal element further comprises at least N-1 deflecting units located between said light source and said polygon mirror, wherein each of the deflecting units deflects a corresponding one of the plurality of light beams in sub-scan directions and adjusts scan line pitch.

12. The image forming apparatus as claimed in claim 11, wherein said photosensitive medium is a photoconductive photosensitive body, and an electrostatic latent image formed by the light scanning is made visible by being converted into a toner image.

13. The image forming apparatus as claimed in claim 11, wherein said image forming apparatus is a tandem type in which one or more photosensitive bodies that are drum-shaped or belt-shaped are provided along the path of a toner image medium, and a toner image formed on each photosensitive body is transferred to said toner image medium generating a composite color image.

14. The image forming apparatus as claimed in claim 13, wherein four photosensitive bodies are provided corresponding to magenta, cyan, yellow, and black, or three photosensitive bodies are provided corresponding to red, green, and blue.

15. An image forming apparatus, comprising:
a photosensitive medium; and
a light scanning apparatus configured to scan said photosensitive medium with a light beam, said light scanning apparatus further comprising:
a liquid crystal element configured to deflect the light beam to adjust the position of a light spot of said light beam formed on said photosensitive medium, said liquid crystal element being provided between a light source and a polygon mirror; and
a compensating unit configured to compensate the light intensity of the light beam at the photosensitive medium due to a change caused by the adjustment of said position of the light spot, wherein said photosensitive medium is a photoconductive photosensitive body, an electrostatic latent image formed by the light scanning is made visible by being converted into a toner image, said light scanning apparatus is configured to scan said photoconductive photosensitive body with a plurality of N light beams emitted by N light sources, and said liquid crystal element further comprises at least N-1 deflecting units located between said light source and said polygon mirror, each of the deflecting units being configured to deflect a corresponding one of the plurality of light beams in a sub-scan direction and to adjust a scan line pitch.

16. A light scanning apparatus, comprising:
a liquid crystal element configured to deflect a light beam from a light source to adjust the position of a light spot formed by said light beam on a scanned face, wherein the ratio of a change in transmissivity (%) of said liquid crystal element caused by the deflection to a deflecting angle (minute) is equal to or smaller than 2.0 (%/minute).

17. The light scanning apparatus as claimed in claim 16, wherein said ratio is equal to or smaller than 2.0 (%/minute) in 10 or more ranges of said deflecting angle, said ranges appearing cyclically.

18. The light scanning apparatus as claimed in claim 16, further comprising:
a detecting unit configured to detect the intensity of said light beam on said scanned face.

19. The light scanning apparatus as claimed in claim 16, further comprising a compensating unit configured to compensate the intensity of said light beam on said scanned face.

20. An image forming apparatus, comprising:
a scanned face; and
a light scanning apparatus configured to scan said scanned face with a light beam and to form an electrostatic latent image on said scanned face, wherein said light scanning apparatus further comprises:
a liquid crystal element configured to deflect said light beam from a light source to adjust the position of a light spot formed by said light beam on said scanned face, wherein the ratio of a change in transmissivity (%) of said liquid crystal element caused by the deflection to a deflecting angle (minute) is equal to or smaller than 2.0 (%/minute).

* * * * *